US007151764B1

(12) United States Patent
Heinonen et al.

(10) Patent No.: US 7,151,764 B1
(45) Date of Patent: Dec. 19, 2006

(54) SERVICE NOTIFICATION ON A LOW BLUETOOTH LAYER

(75) Inventors: Tomi Heinonen, Tampere (FI); Timo M. Laitinen, Tampere (FI)

(73) Assignee: Nokia Corporation, Espoo (FI)

( * ) Notice: Subject to any disclaimer, the term of this patent is extended or adjusted under 35 U.S.C. 154(b) by 1089 days.

(21) Appl. No.: 09/985,192

(22) Filed: Nov. 1, 2001

(51) Int. Cl.
H04Q 7/24 (2006.01)
(52) U.S. Cl. .................. 370/338; 709/203; 709/217
(58) Field of Classification Search .................... None
See application file for complete search history.

(56) References Cited

U.S. PATENT DOCUMENTS

| 5,493,692 | A | 2/1996 | Theimer et al. |
| 5,606,617 | A | 2/1997 | Brands |
| 5,668,878 | A | 9/1997 | Brands |
| 5,696,827 | A | 12/1997 | Brands |
| 5,749,081 | A | 5/1998 | Whiteis |
| 5,790,974 | A | 8/1998 | Tognazzini |
| 5,835,061 | A | 11/1998 | Stewart |
| 5,838,685 | A | 11/1998 | Hochman |
| 5,987,099 | A | 11/1999 | O'Neill et al. |
| 6,006,200 | A | 12/1999 | Boies et al. |
| 6,023,241 | A | 2/2000 | Clapper |
| 6,041,311 | A | 3/2000 | Chislenko et al. |
| 6,044,062 | A | 3/2000 | Brownrigg et al. |
| 6,049,777 | A | 4/2000 | Sheena et al. |
| 6,052,467 | A | 4/2000 | Brands |
| 6,064,980 | A | 5/2000 | Jacobi et al. |
| 6,065,012 | A | 5/2000 | Balsara et al. |
| 6,092,049 | A | 7/2000 | Chislenko et al. |
| 6,108,493 | A | 8/2000 | Miller et al. |
| 6,108,688 | A | 8/2000 | Nielsen |
| 6,119,101 | A | 9/2000 | Peckover |
| 6,138,158 | A | 10/2000 | Boyle et al. |
| 6,138,159 | A | 10/2000 | Phaal |
| 6,167,278 | A | 12/2000 | Nilssen |
| 6,175,743 | B1 | 1/2001 | Alperovich et al. |
| 6,182,050 | B1 | 1/2001 | Ballard |
| 6,195,651 | B1 | 2/2001 | Handel et al. |
| 6,195,657 | B1 | 2/2001 | Rucker et al. |
| 6,199,099 | B1 | 3/2001 | Gershman et al. |

(Continued)

FOREIGN PATENT DOCUMENTS

AU 200135071 10/2001

(Continued)

OTHER PUBLICATIONS

Customized Messaging Between Wireless Access Point and Services, Nov. 1, 2001, Heinonen et al.

(Continued)

*Primary Examiner*—Bob A. Phunkulh
(74) *Attorney, Agent, or Firm*—Morgan & Finnegan, LLP

(57) ABSTRACT

A method is provided to minimize the protocol stacks needed for a short range wireless access point to rapidly communicate a message to a short range wireless mobile device and display it to the user. The short range wireless access point device stores an Access Point Service Indicator (APSI) message characterizing the service platform offerings. The APSI message has a unique message ID in its header. The user device's transport protocol layer is modified to detect the unique message ID and load it into an APSI message buffer. The transport protocol layer passes the APSI message directly to the application layer, bypassing the middleware protocol layers. The method can be applied to communications between various types of wireless devices to enable rapid communication, such as between two mobile devices, between fixed and mobile devices, between short range devices or between long range devices.

44 Claims, 13 Drawing Sheets

U.S. PATENT DOCUMENTS

| | | |
|---|---|---|
| 6,205,472 B1 | 3/2001 | Gilmour |
| 6,236,768 B1 | 5/2001 | Rhodes et al. |
| 6,243,581 B1 | 6/2001 | Jawanda |
| 6,253,202 B1 | 6/2001 | Gilmour |
| 6,253,203 B1 | 6/2001 | O'Flaherty et al. |
| 6,263,447 B1 | 7/2001 | French et al. |
| 6,266,048 B1 | 7/2001 | Carau, Sr. |
| 6,272,129 B1 | 8/2001 | Dynarski et al. |
| 6,275,824 B1 | 8/2001 | O'Flaherty et al. |
| 6,285,879 B1 | 9/2001 | Lechner et al. |
| 6,317,781 B1 | 11/2001 | De Boor et al. |
| 6,321,257 B1 | 11/2001 | Kotola et al. |
| 6,330,448 B1 | 12/2001 | Otsuka et al. |
| 6,351,271 B1 | 2/2002 | Mainwaring et al. |
| 6,414,955 B1 | 7/2002 | Clare et al. |
| 6,421,707 B1 | 7/2002 | Miller et al. |
| 6,430,395 B1 | 8/2002 | Arazi et al. |
| 6,430,413 B1 | 8/2002 | Wedi et al. |
| 6,438,585 B1 | 8/2002 | Mousseau et al. |
| 6,445,921 B1 | 9/2002 | Bell |
| 6,477,373 B1 | 11/2002 | Rappaport et al. |
| 6,484,196 B1 | 11/2002 | Maurille |
| 6,493,550 B1 | 12/2002 | Raith |
| 6,496,849 B1 | 12/2002 | Hanson et al. |
| 6,510,381 B1 | 1/2003 | Grounds et al. |
| 6,515,974 B1 | 2/2003 | Inoue et al. |
| 6,519,453 B1 | 2/2003 | Hamada et al. |
| 6,527,641 B1 | 3/2003 | Sinclair et al. |
| 6,539,225 B1 | 3/2003 | Lee |
| 6,542,740 B1 | 4/2003 | Olgaard et al. |
| 6,549,768 B1 | 4/2003 | Fraccaroli |
| 6,554,707 B1 | 4/2003 | Sinclair et al. |
| 6,560,456 B1 | 5/2003 | Lohtia et al. |
| 6,625,460 B1 | 9/2003 | Patil |
| 6,674,403 B1 | 1/2004 | Gray et al. |
| 6,678,516 B1 | 1/2004 | Nordman et al. |
| 6,697,018 B1 | 2/2004 | Stewart |
| 6,721,542 B1 | 4/2004 | Anttila et al. |
| 6,785,542 B1 | 8/2004 | Blight et al. |
| 6,862,276 B1 * | 3/2005 | Abrol et al. ............... 370/349 |
| 6,917,960 B1 * | 7/2005 | Decasper et al. .......... 709/203 |
| 2001/0021649 A1 | 9/2001 | Kinnunen et al. |
| 2001/0039546 A1 | 11/2001 | Moore et al. |
| 2002/0002705 A1 | 1/2002 | Byrnes et al. |
| 2002/0006788 A1 | 1/2002 | Knutsson et al. |
| 2002/0013815 A1 | 1/2002 | Obradovich et al. |
| 2002/0015042 A1 | 2/2002 | Robotham et al. |
| 2002/0019882 A1 | 2/2002 | Soejima et al. |
| 2002/0022453 A1 | 2/2002 | Balog et al. |
| 2002/0052873 A1 | 5/2002 | Delgado et al. |
| 2002/0061741 A1 | 5/2002 | Leung et al. |
| 2002/0065881 A1 | 5/2002 | Mansikkaniemi et al. |
| 2002/0082921 A1 | 6/2002 | Rankin |
| 2002/0083025 A1 | 6/2002 | Robarts et al. |
| 2002/0094778 A1 | 7/2002 | Cannon et al. |
| 2002/0126872 A1 | 9/2002 | Brunk et al. |
| 2002/0158917 A1 | 10/2002 | Sinclair et al. |
| 2002/0191017 A1 | 12/2002 | Sinclair et al. |
| 2002/0193073 A1 | 12/2002 | Fujioka |
| 2002/0198882 A1 | 12/2002 | Linden et al. |
| 2003/0002504 A1 | 1/2003 | Forstadius |
| 2003/0008662 A1 | 1/2003 | Stern et al. |
| 2003/0013459 A1 | 1/2003 | Rankin et al. |
| 2003/0027636 A1 | 2/2003 | Covannon et al. |
| 2003/0036350 A1 | 2/2003 | Jonsson et al. |
| 2003/0054794 A1 | 3/2003 | Zhang |
| 2003/0092376 A1 | 5/2003 | Syed |
| 2003/0115038 A1 | 6/2003 | Want et al. |
| 2003/0119446 A1 | 6/2003 | Fano et al. |
| 2003/0119494 A1 | 6/2003 | Alanara et al. |
| 2003/0140246 A1 | 7/2003 | Kammer et al. |
| 2003/0171147 A1 | 9/2003 | Sinclair et al. |
| 2003/0177113 A1 | 9/2003 | Wakita |
| 2003/0208595 A1 | 11/2003 | Gouge et al. |
| 2004/0073793 A1 | 4/2004 | Takeda |
| 2004/0181517 A1 | 9/2004 | Jung et al. |
| 2004/0181540 A1 | 9/2004 | Jung et al. |
| 2004/0202132 A1 | 10/2004 | Heinonen et al. |
| 2005/0260996 A1 | 11/2005 | Groenendaal |

FOREIGN PATENT DOCUMENTS

| | | |
|---|---|---|
| BE | 1010909 | 3/1999 |
| EP | 0 788 065 | 8/1997 |
| EP | 0 891 110 | 1/1999 |
| EP | 0 944 176 | 9/1999 |
| EP | 1 041 849 | 10/2000 |
| EP | 1 130 869 | 9/2001 |
| EP | 1 187 023 | 3/2002 |
| EP | 1217792 | 6/2002 |
| EP | 1282289 | 2/2003 |
| JP | 01-111401 | 4/1989 |
| WO | WO 97/49255 | 12/1997 |
| WO | WO 99/32985 | 7/1999 |
| WO | WO 99/37105 | 7/1999 |
| WO | WO 99/51048 | 10/1999 |
| WO | WO 99/66428 | 12/1999 |
| WO | WO 00/11563 | 3/2000 |
| WO | WO 00/11793 | 3/2000 |
| WO | WO 00/32002 | 6/2000 |
| WO | WO 00/69202 | 11/2000 |
| WO | WO 00/74424 | 12/2000 |
| WO | WO 04/4372 | 1/2001 |
| WO | WO 01/35253 | 5/2001 |
| WO | WO 01/35269 | 5/2001 |
| WO | WO 01/39577 | 6/2001 |
| WO | WO 01/46826 | 6/2001 |
| WO | WO 01/50299 | 7/2001 |
| WO | WO 01/67799 | 9/2001 |
| WO | WO 01/82532 | 11/2001 |
| WO | WO 01/86419 | 11/2001 |
| WO | WO 02/03626 | 1/2002 |
| WO | WO 02/11456 | 2/2002 |
| WO | WO 03/17592 | 2/2003 |
| WO | WO 03/088578 A1 | 10/2003 |
| WO | WO 2004/4372 | 1/2004 |

OTHER PUBLICATIONS

Local Service Handover, Nov. 1, 2001, Heinonen et al.
U.S. Appl. No. 09/406,596, filed Sep. 24, 1999, Schulz et al.
U.S. Appl. No. 10/504,410, filed Aug. 13, 2004, Hamberg.
Forner, "A Multi-Agent Referral System for Matchmaking", MIT Media Lab, Apr. 22, 1996, pp. 245-261.
http://www.saycupid.com, Aug. 13, 2003, 2 pp.
http://www.commerce.usask.ca/faculity/linksE_commerce/lovegety.htm, Aug. 13, 2003, 2 pp.
http://www.genesconnected.co.uk, Aug. 13, 2003, 1 pp.
http://www.amazon.com.exec/obidos/subst/home/home.html/022002250..., Aug. 13, 2003, 4 pp.
http://www.ebay.com, Aug. 13, 2003, 2 pp.
Bluetooth Specification, "Bluetooth Assigned Numbers, Appendix VIII", Version 1.0B, Nov. 29, 1999, pp. 1010-1032.
U.S. Appl. No. 10/954,197, filed Oct. 1, 2004, Malinen et al.
Bluetooth Specification "Service Discovery Protocol" Version 1.0B, Nov. 29, 1999, pp. 324-1082.
Haartsen "Bluetooth—The Universal Radio Interface for AD HOC, Wireless Connectivity", Ericsson Review No. 3, 1998, pp. 110-117.
Peddemors et al. "Combining Presence, Location and Instant Messaging In A Context-Aware Mobile Application Framework", GigaMobile/D2.8, Telematica Instituut, Mar 20, 2002, pp. 3-13.
Bisdikian et al. "Quests In A Tetherless World", Wireless Communications and Mobile Computing 2002; 2:449-464, John Wiley & Sons, Ltd., 2002, pp. 449-464.

"How to Inquire About Services On a Remote Device", web page [online], Symbian Ltd, 2002 [1 page retrieved on Dec. 31, 2003]. Retrieved from the Internet: <http://www.symbian.com/developer/techlib/v70docs/SDL v7.0/doc source/DevGuides/cpp/..>.

U.S. Appl. No. 09/854,635, filed May 15, 2001, Kaita et al.

U.S. Appl. No. 09/950,773, filed Sep. 13, 2001, Kaita et al.

U.S. Appl. No. 10/101,688, filed Mar. 21, 2002, Aholainen et al.

U.S. Appl. No. 10/073,200, filed Feb. 13, 2002, Hamberg.

* cited by examiner

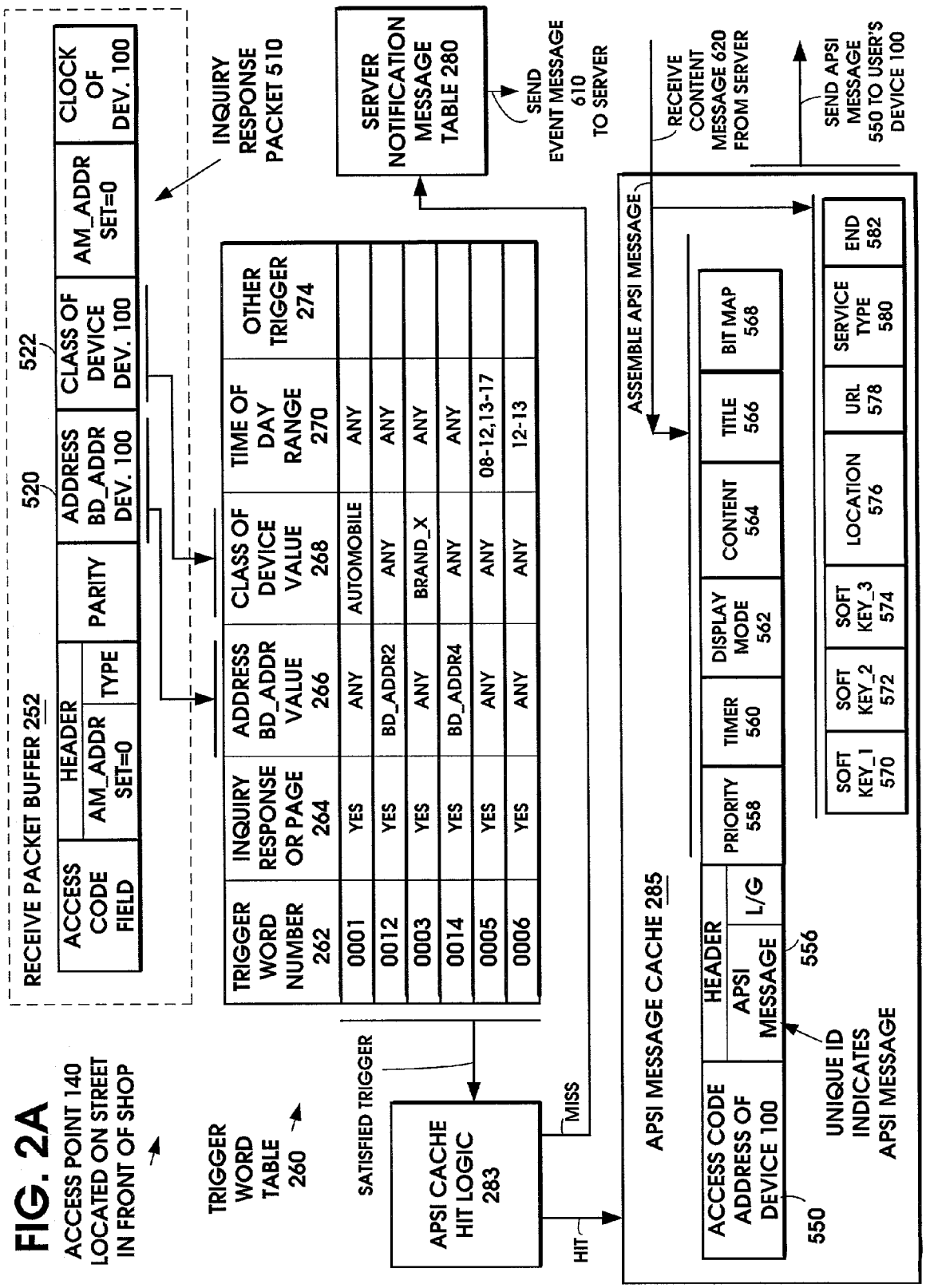

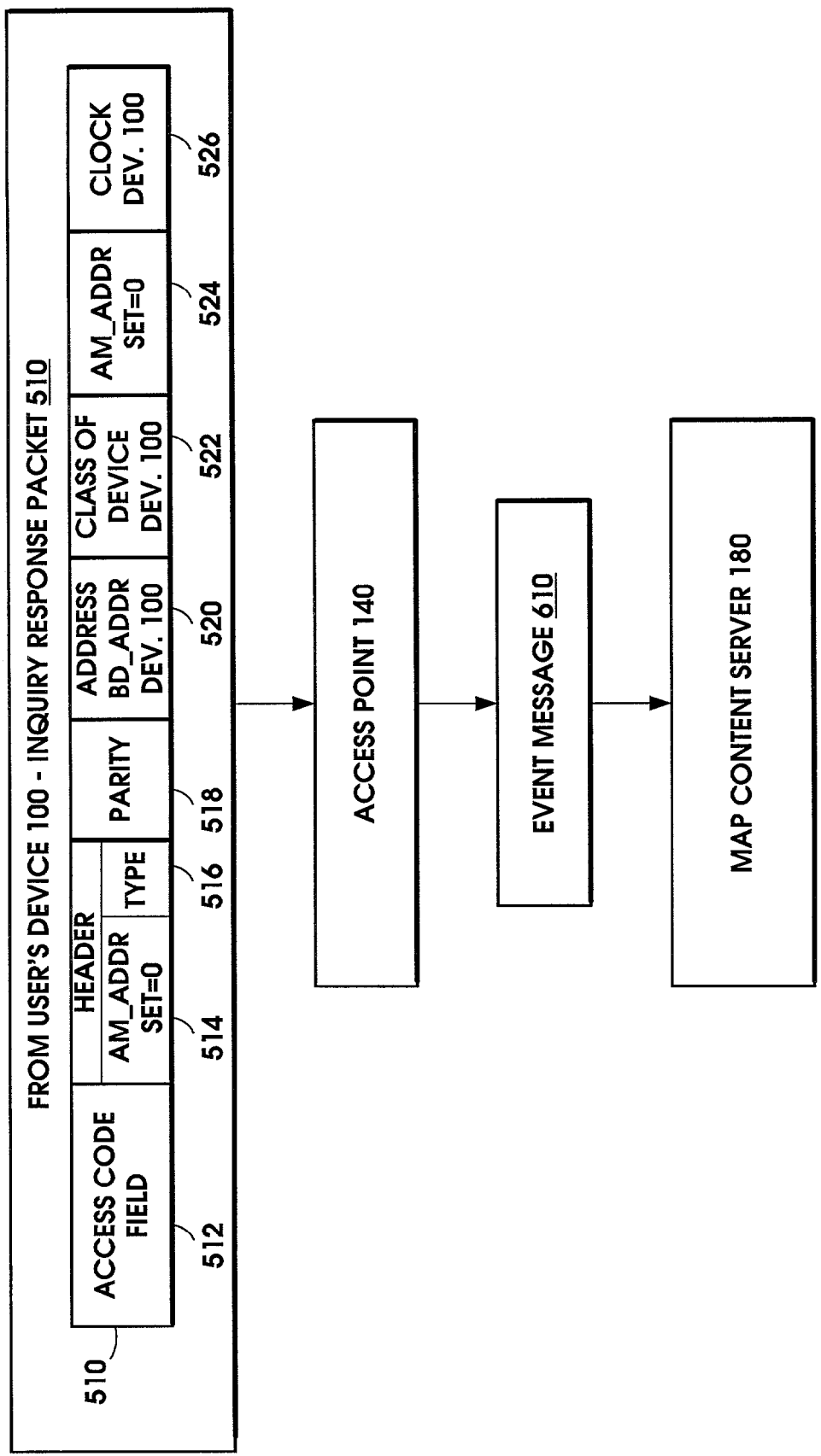

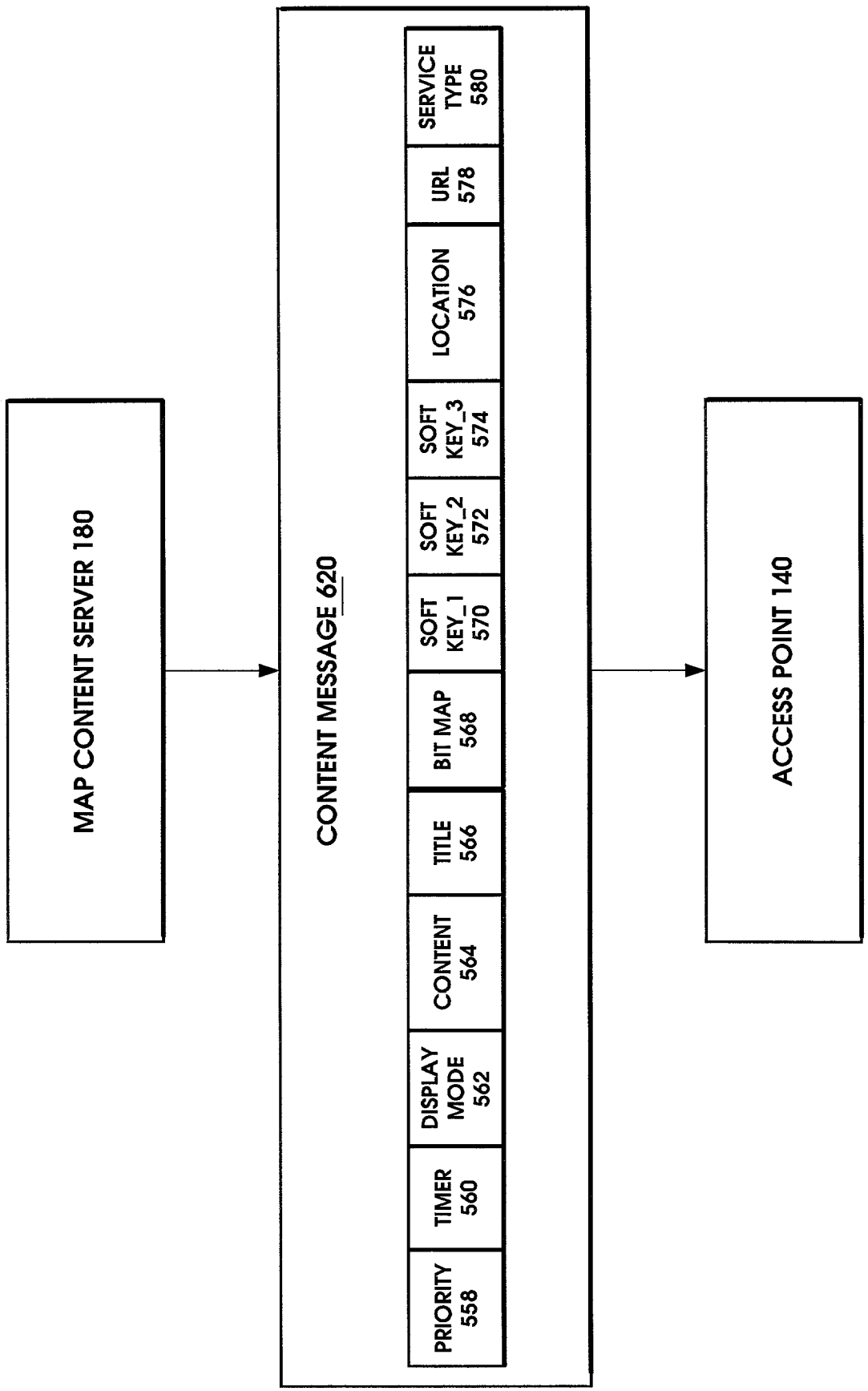

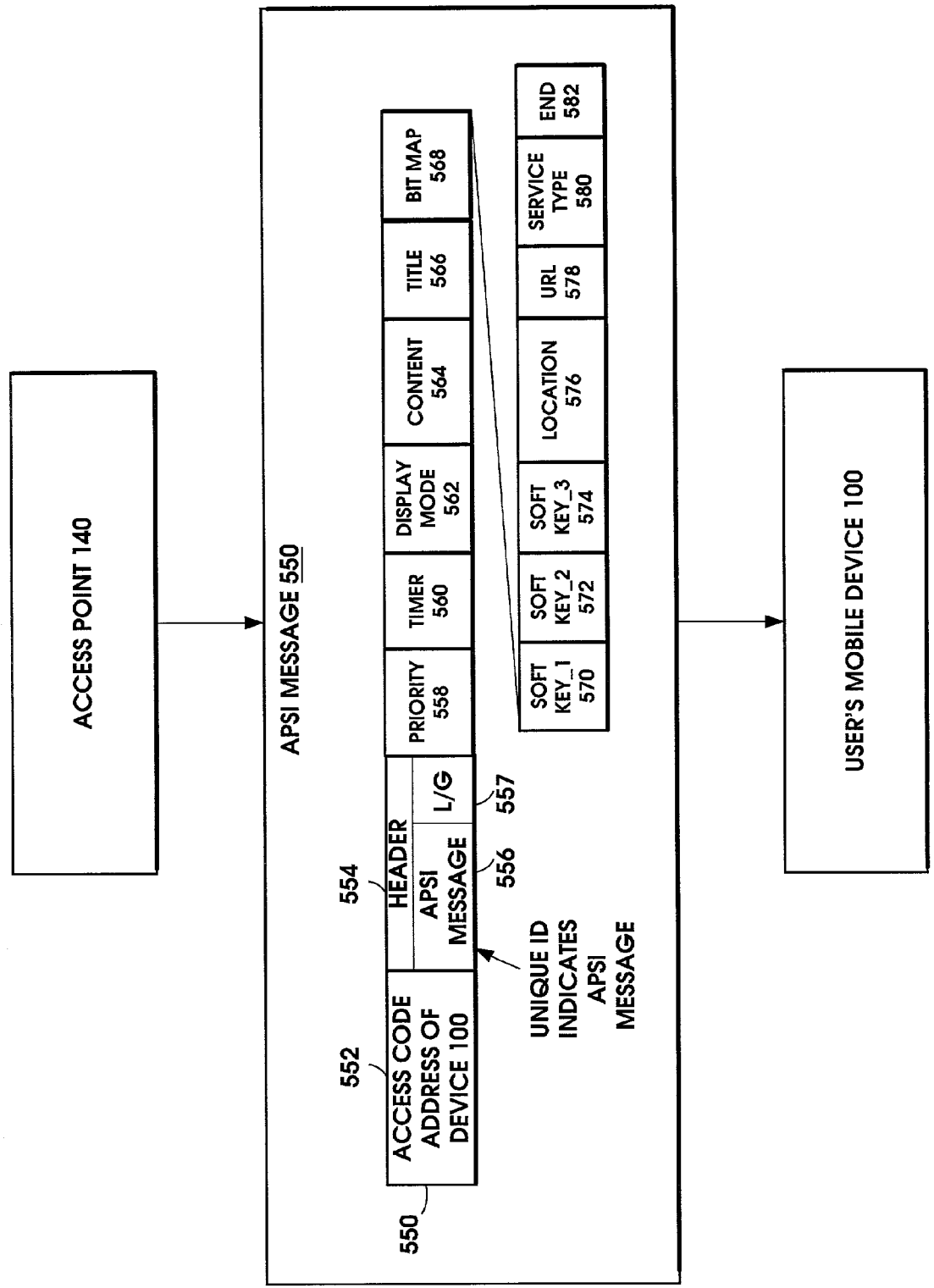

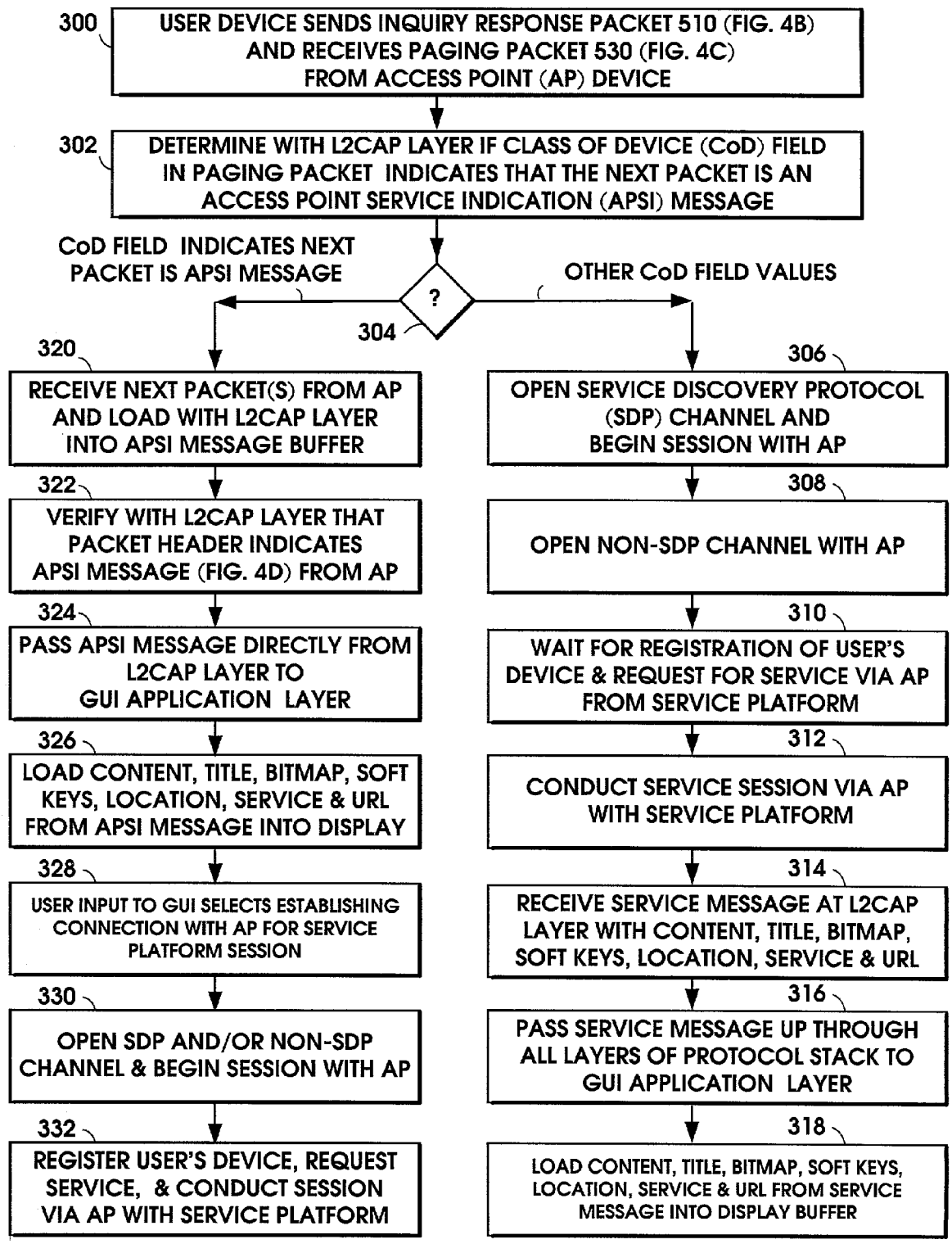

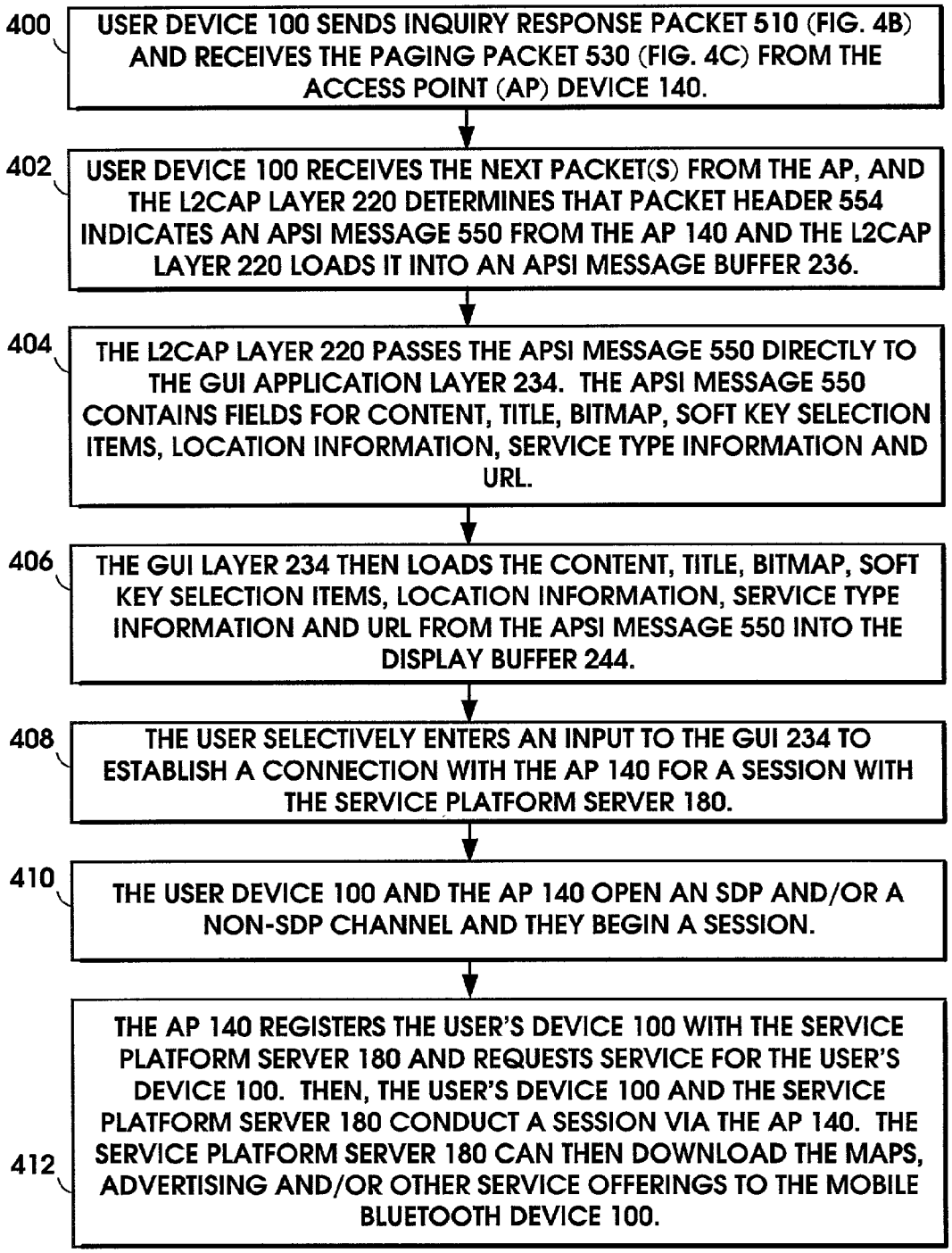

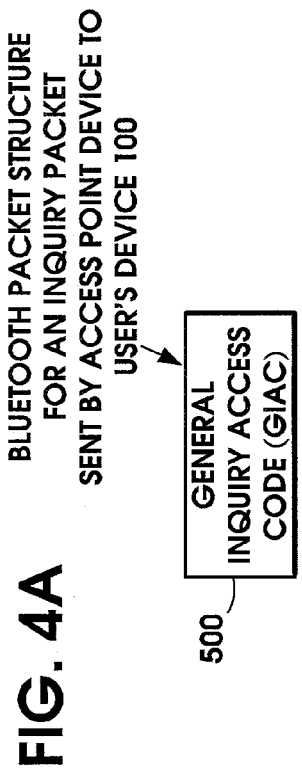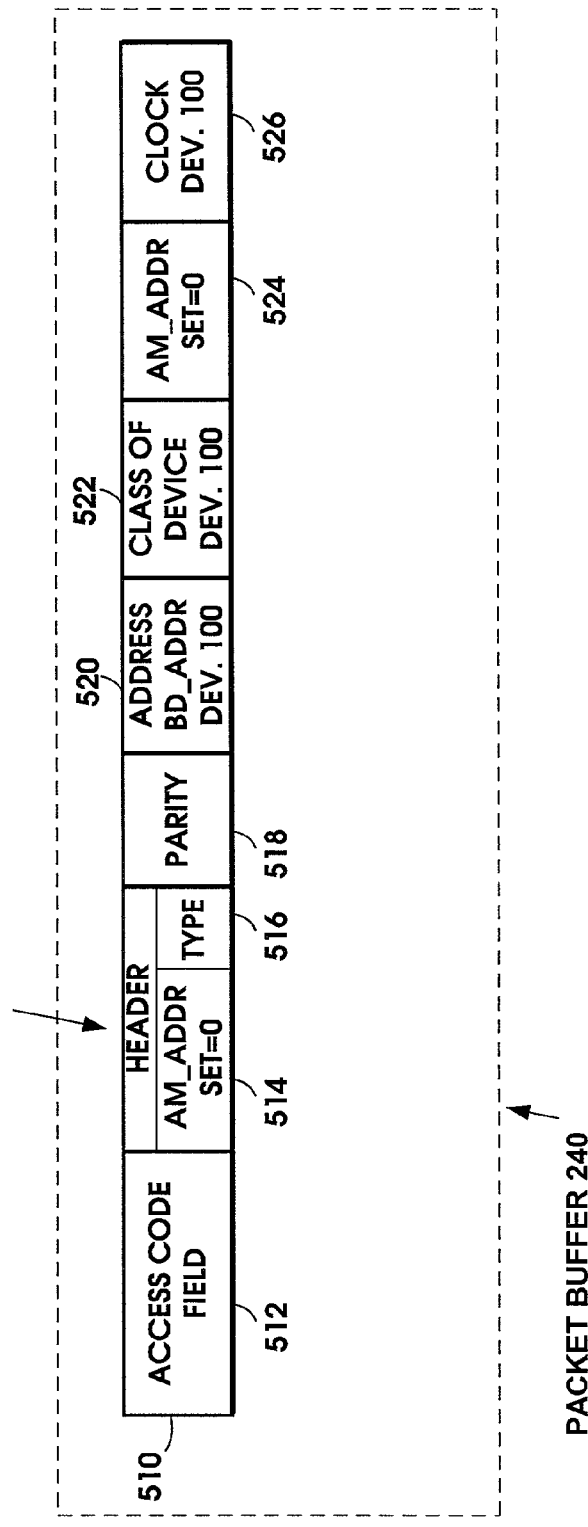

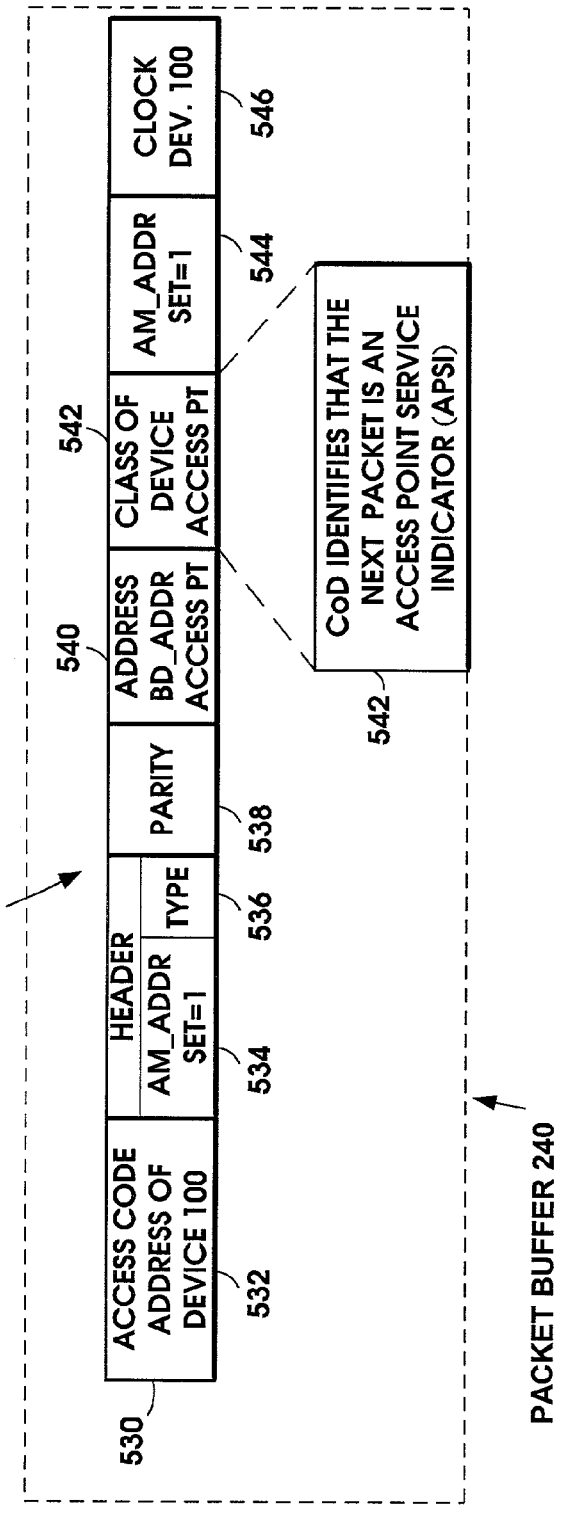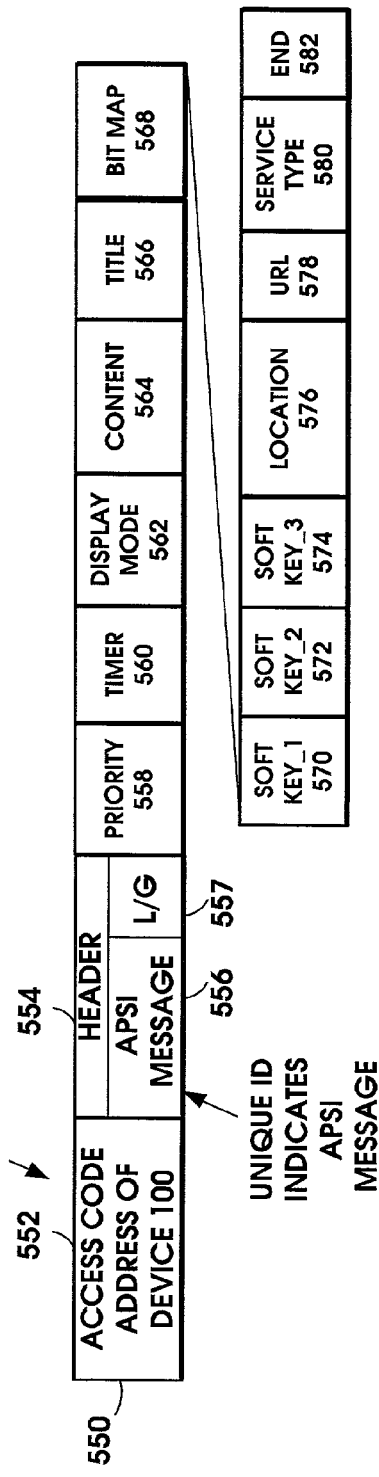
FIG. 4C  BLUETOOTH PACKET STRUCTURE FOR A PAGING PACKET SENT BY ACCESS POINT DEVICE TO USER'S PAGED DEVICE
FIG. 4D  BLUETOOTH PACKET STRUCTURE FOR AN ACCESS POINT SERVICE INDICATOR MESSAGE SENT BY ACCESS POINT TO USER'S DEVICE 100 FOLLOWING PAGING PACKET 530

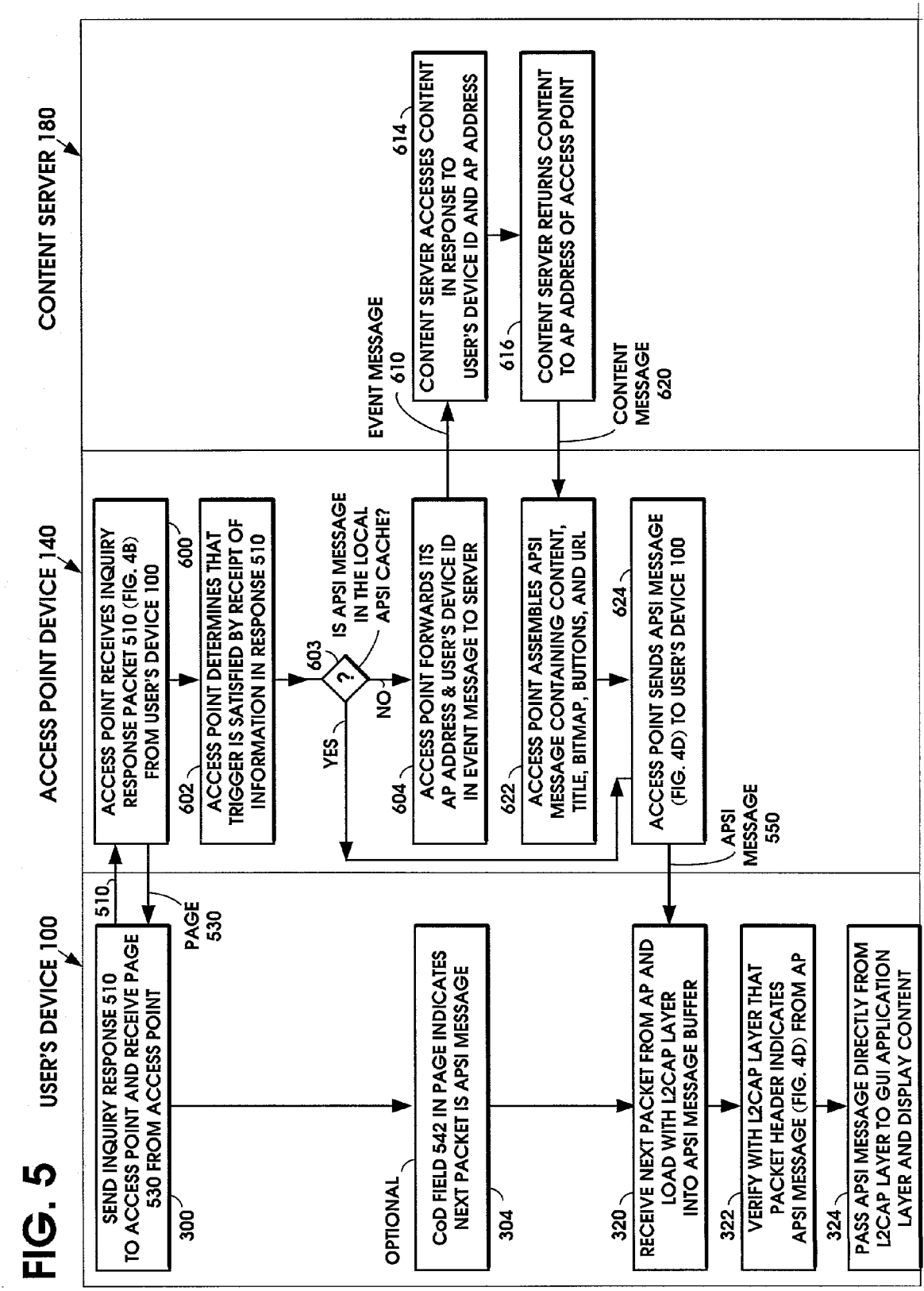

SERVICE NOTIFICATION ON A LOW BLUETOOTH LAYER

FIELD OF THE INVENTION

The invention disclosed broadly relates to ubiquitous computing and more particularly relates to improvements in short range wireless technology.

BACKGROUND OF THE INVENTION

Short Range Wireless Systems

Short range wireless systems have a typical range of one hundred meters or less. They often combine with systems wired to the Internet to provide communication over long distances. The category of short range wireless systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks generally operate at higher peak speeds of between 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HIPER-LAN Standard, which operates in the 5 GHz U-NII band.

The Bluetooth Short Range Wireless Technology

Bluetooth is a short range radio network, originally intended as a cable replacement. It can be used to create networks of up to eight devices operating together. The Bluetooth Special Interest Group, Specification Of The Bluetooth System, Volumes 1 and 2, Core and Profiles: Version 1.1, 22nd Feb., 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten meter radio communications range and to discover what services they offer, using a service discovery protocol (SDP).

The SDP searching function relies on links being established between the requesting Bluetooth device, such as a stationary access point device, and the responding Bluetooth device, such as a mobile user's device. When the mobile user's device enters within communicating range of the access point, its Link Controller layer in its transport protocol group handles the exchange of inquiry and paging packets to establish the initial link with the access point device. This process is relatively fast, typically being completed in approximately from one to five seconds. Then the Logical Link Control and Adaptation Protocol (L2CAP) layer in the transport protocol group passes the link status up to the layers in the middleware protocol group. The SDP searching function in the middleware protocol group can then be used to find out about application programs in the responding Bluetooth device that may provide desired services. The SDP searching function can require several seconds to complete, depending on the complexity of the search and the size of the device's registry.

An example application program service that can be discovered by the SDP searching function is the Wireless Application Environment (WAE) graphical user interface (GUI) function of the Wireless Application Protocol (WAP). WAP-enabled wireless devices can use a microbrowser to display content on a small screen of the device. WAP uses a combination of Internet protocols with other protocols especially modified to work with mobile devices. The Internet protocols are: Point to Point Protocol (PPP), Internet Protocol (IP), and User Datagram Protocol (UDP). The special mobile device protocols are: Wireless Transport Layer Security (WTLS), Wireless Transaction Protocol (WTP), Wireless Session Protocol (WSP), and Wireless Application Environment (WAE). It is the WAE that provides the microbrowser user interface for WAP. In order to establish a connection to send content from the requesting access point device to the WAE microbrowser of the responding user's device, each of the WAP protocol layers WTLS, WTP, WSP, and WAE must be established, which can require several more seconds to complete and possibly significant user interaction on the way.

It can be seen that if the user's mobile Bluetooth device has enough speed to travel across the communications area of the Bluetooth access point in less than a few seconds, there will not be enough time to complete a connection between the two devices.

The IEEE 802.11 Wireless LAN Standard

The IEEE 802.11 Wireless LAN Standard defines at least two different physical (PHY) specifications and one common medium access control (MAC) specification. The IEEE 802.11(a) Standard is designed for either the 2.4 GHz ISM band or the 5 GHz U-NII band, and uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 networks can be configured where the mobile stations communicate with a fixed access point. IEEE 802.11 also supports distributed activities similar those of the Bluetooth piconets. The IEEE 802.11 standard provides wireless devices with service inquiry features similar to the Bluetooth inquiry and scanning features.

In order for an IEEE 802.11 mobile station to communicate with other stations in a network, it must first find the stations. The process of finding another station is by inquiring. Active inquiry requires the inquiring station to transmit queries and invoke responses from other wireless stations in a network. In an active inquiry, the mobile station will transmit a probe request frame. If there is a network on the same channel that matches the service set identity (SSID) in the probe request frame, a station in that network will respond by sending a probe response frame to the inquiring station. The probe response includes the information necessary for the inquiring station to access a description of the network. The inquiring station will also process any other received probe response and Beacon frames. Once the inquiring station has processed any responses, or has decided there will be no responses, it may change to another channel and repeat the process. At the conclusion of the inquiry, the station has accumulated information about the networks in its vicinity. Once a station has performed an inquiry that results in one or more network descriptions, the station may choose to join one of the networks. The IEEE 802.11 Wireless LAN Standard is published in three parts as IEEE 802.11-1999; IEEE 802.11a-1999; and IEEE 802.11b-1999, which are available from the IEEE, Inc. web site http://grouper.ieee.org/groups/802/11.

In the case of IEEE 802.11 mobile stations, if the user's mobile device has enough speed to travel across the communications area of the IEEE 802.11 access point in less than a minimum interval, there will not be enough time to complete a connection between the two devices.

High Performance Radio Local Area Network (HIPERLAN)

The HIPERLAN standard provides a wireless LAN with a high data rate of up to 54 Mbps and a medium-range of 50 meters. HIPERLAN wireless LANs provide multimedia distribution with video QoS, reserved spectrum, and good in-building propagation. There are two HIPERLAN standards. HIPERLAN Type 1 is a dynamic, priority driven channel access protocol similar to wireless Ethernet. HIPERLAN Type 2 is reserved channel access protocol similar to a wireless version of ATM. Both HIPERLAN Type 1 and HIPERLAN Type 2 use dedicated spectrum at 5 GHz. HIPERLAN Type 1 uses an advanced channel equalizer to deal with intersymbol interference and signal multipath. HIPERLAN Type 2 avoids these interference problems by using OFDM and a frequency transform function. The HIPERLAN Type 2 specification offers options for bit rates of 6, 16, 36, and 54 Mbps. The physical layer adopts an OFDM multiple carrier scheme using 48 carrier frequencies per OFDM symbol. Each carrier may then be modulated using BPSK, QPSK, 16-QAM, or 64-QAM to provide different data rates. The modulation schemes chosen for the higher bit rates achieve throughput in the range 30–50 Mbps.

The HIPERLAN Type 1 is a dynamic, priority driven channel access protocol that can form networks of wireless devices. HIPERLAN Type 1 networks support distributed activities similar those of the Bluetooth piconets and IEEE 802.11 independent basic service sets (IBSS). The HIPERLAN Type 1 standard provides wireless devices with service inquiry features similar to those of the Bluetooth inquiry and scanning features and the IEEE 802.11 probe request and response features. An overview of the HIPERLAN Type 1 principles of operation is provided in the publication *HIPERLAN Type 1 Standard*, ETSI ETS 300 652, WA2 December 1997.

HIPERLAN Type 2 is a reserved channel access protocol that forms networks. HIPERLAN Type 2 networks support distributed activities similar those of the HIPERLAN Type 1 networks, Bluetooth piconets and IEEE 802.11 independent basic service sets (IBSS). HIPERLAN Type 2 provides high speed radio communication with typical data rates from 6 MHz to 54 Mbps. It connects portable devices with broadband networks that are based on IP, ATM and other technologies. Centralized mode is used to operate HIPERLAN Type 2 as an access network via a fixed access point. A central controller (CC) in the fixed access point provides QoS coordinates the access of the mobile stations support. User mobility is supported within the local service area and wide area roaming mobility can also be supported. An overview of the HIPERLAN Type 2 principles of operation is provided in the Broadband Radio Access Networks (BRAN), *HIPERLAN Type 2; System Overview*, ETSI TR 101 683 VI.I.1 (2000-02) and a more detailed specification of its ad hoc network architecture is described in *HIPERLAN Type 2, Data Link Control (DLC) Layer; Part 4. Extension for Home Environment*, ETSI TS 101 761-4 V1.2.1 (2000-12).

In the case of HIPERLAN mobile stations, if the user's mobile device has enough speed to travel across the communications area of the HIPERLAN access point in less than a minimum interval, there will not be enough time to complete a connection between the two devices.

What is needed is a way to minimize the protocol stacks needed to rapidly communicate a message to a short range wireless device, such as Bluetooth device, and display it to the user.

SUMMARY OF THE INVENTION

The invention solves the problem of reducing the protocol stacks needed for a short range RF access point to rapidly communicate a message to a short range RF mobile device and display it to the user. The invention can be applied to communications between various types of wireless devices to enable rapid communication, such as between two mobile devices, between fixed and mobile devices, between short range devices or between long range devices. In accordance with the invention, the short range RF access point device stores an Access Point Service Indicator (APSI) message characterizing the service platform offerings. The APSI message has a unique message ID in its header. In accordance with the invention, the class of device (CoD) field of the paging packet sent by the short range RF access point device includes a unique CoD value indicating that the next packet to be received from the short range RF access point device is the Access Point Service Indicator (APSI) message. In accordance with the invention, the user device's L2CAP layer is modified to detect the unique CoD value, indicating that the next packet is an Access Point Service Indication (APSI) message. Then, in accordance with the invention, when the user's device receives the next packet from the Access Point, the L2CAP layer loads it into an APSI message buffer. The principle of the invention also applies to establishing rapid communications between two mobile, short range RF devices.

In an alternate embodiment of the invention, there is no need for the access point to send a preliminary CoD-warning to the user's device. Instead, after a normal exchange of inquiry and paging packets, the APSI message is sent by the access point to the user's device and its L2CAP layer recognizes the APSI message. The message header identifies the message as an APSI message and the L2CAP layer in the user's device forwards it directly to the GUI.

In accordance with the invention, the APSI message includes a header with the unique message ID that indicates it is an APSI message. The L2CAP layer verifies that packet header has the unique message ID indicating it is an APSI message from the Access Point. Then, the L2CAP layer passes the APSI message directly to the GUI application layer, bypassing the middleware protocol layers. It also bypasses the WAP layers.

The APSI message may contain fields for content, title, bitmap, softkey selection information, location information, URL information and service type information, which are transmitted by the access point to a mobile Bluetooth device. The APSI message has a unique message ID in its header, which enables the mobile Bluetooth device to quickly process and display the content in the APSI message.

In accordance with the invention, when an inquiry response or page packet is received by the access point from a mobile Bluetooth device, the access point uses the information in the received packet as stimuli to be matched with trigger words stored in a trigger word table. If there is a match, then an APSI message cache is checked to determine if a corresponding APSI message is stored in the cache. If there is a corresponding APSI message in the cache, then it is immediately sent to the mobile Bluetooth device.

In an alternate embodiment of the invention, the Access Point sends one (or more) APSI messages which have been stored in its memory, to all mobile devices coming into its coverage area, without the necessity of distinguishing between various types of content in the packets received from the mobile devices.

In accordance with the invention, if there is no corresponding APSI message in the access point cache, then the server notification message corresponding to the trigger word is accessed from a message table and sent to a content server specified in the message. The server notification message can include information such as the mobile device's address and class of device, plus optional ambient information such as the time of day, local weather, geographic coordinates, etc. The server uses this information for an appropriate query to access the content. The content is than returned to the access point where is it assembled into the required APSI message.

The APSI message received by the user's device is immediately recognized as an APSI message, and is passed up to the GUI layer. The L2CAP layer passes the APSI message directly to the GUI application layer, bypassing the middleware protocol layers and the WAP layers. The GUI layer then loads the content, title, bitmap, softkey selection information, location information, URL information and service type information from the APSI message into the display buffer. In accordance with the invention, the user reads the displayed content and selectively enters an input to the GUI to establish a normal connection with the Access Point for a normal session with the service platform. The user device and the Access Point then open an SDP and/or a non-SDP channel and they begin a session. The Access Point registers the user's device with the platform and requests service for the user's device. Then, the user's device and the service platform conduct a normal session via the Access Point.

In an alternate embodiment of the invention, the RFCOMM layer of the transport protocol group can be modified, instead of the L2CAP layer as described above, to perform the functions of the invention.

The resulting invention enables enable rapid communication between various types of wireless communication devices, including paired mobile devices, paired fixed and mobile devices, short range devices, and long range devices.

DESCRIPTION OF THE FIGURES

FIG. 2A is a functional block diagram of the wireless access point 140, with the receive packet buffer 252, trigger word table 260, APSI message cache 285, and APSI cache hit logic 283 in accordance with one embodiment of the invention.

FIG. 2B is a data flow diagram showing the inquiry response packet 510 from the user's device 100 being detected by the access point 140 and the access point sending an event message 610 to the content server 180 in response to determining that the access point 140 does not have a corresponding APSI message in its cache.

FIG. 2C is a data flow diagram showing the content server 180 returning a content message 620 to the access point 140, in response to the server having processed the event message 610.

FIG. 2D is a data flow diagram showing the access point 140 sending the APSI message 550 to the user's mobile device 100, which the access point has assembled from the content message 620 received from the server 180.

FIG. 3 is a flow diagram of the sequence of operational steps performed by the user's device 100 in processing an APSI message.

FIG. 3A is a flow diagram of an alternate embodiment of the invention, which shows the operation of the User's Bluetooth device 100 when receiving an APSI message 550 without any previous warnings.

FIG. 4A shows the Bluetooth packet structure for an inquiry packet 500 sent by a Bluetooth access point device to the user's device 100.

FIG. 4B shows the Bluetooth frequency hop synchronization (FHS) packet structure for an inquiry response packet 510 sent by the user's device 100.

FIG. 4C shows the Bluetooth frequency hop synchronization (FHS) packet structure for the paging packet 530 sent by the Bluetooth access point device according to one embodiment of the invention.

FIG. 4D shows the Bluetooth packet structure for the subsequent APSI message according to one embodiment of the invention.

FIG. 5 is a network process diagram showing the interaction between the user's device 100, the access point 140, and the content server 180 according to one embodiment of the invention.

DISCUSSION OF THE PREFERRED EMBODIMENT

Figure 1:
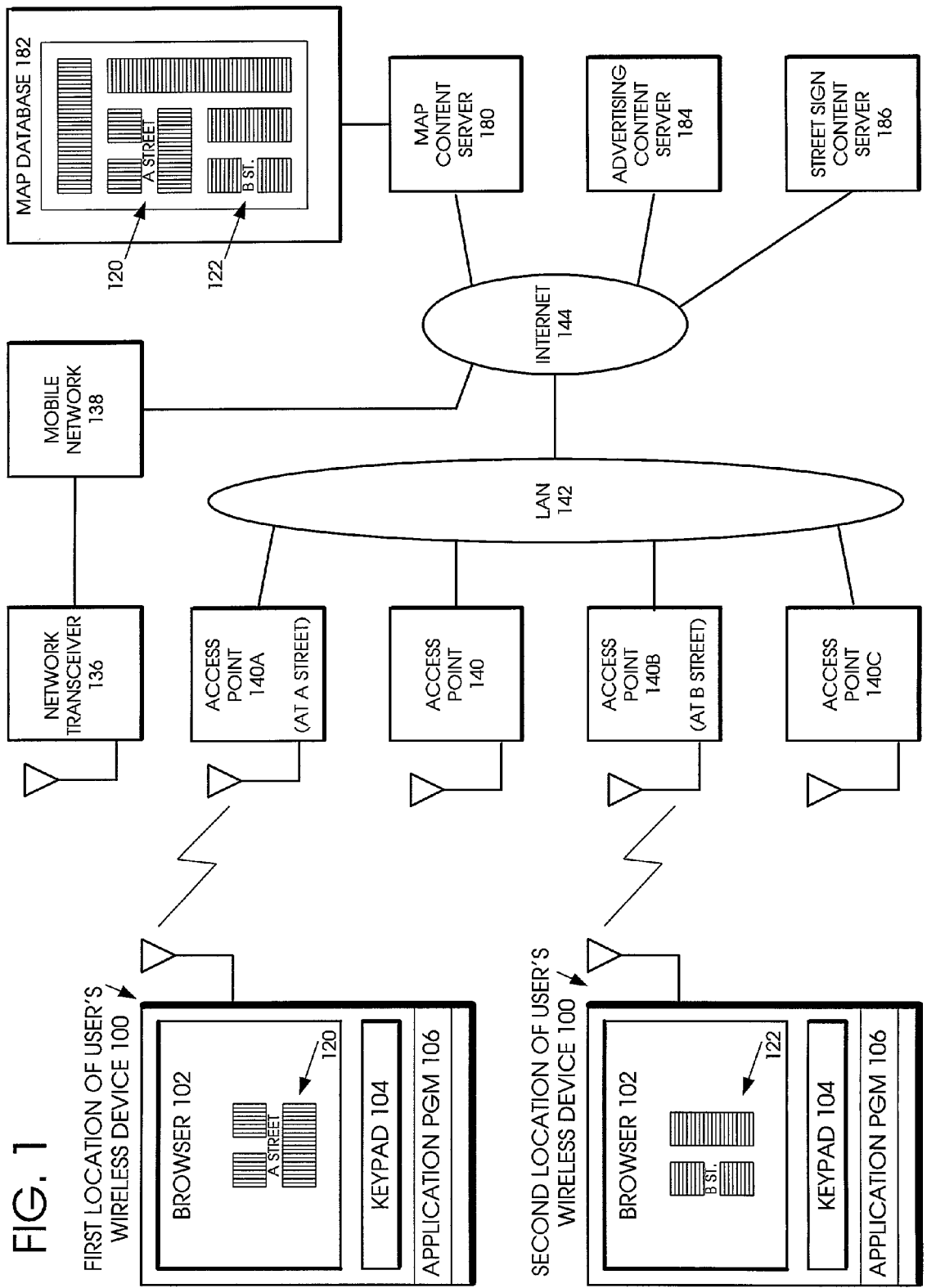
FIG. 1 is an exemplary network diagram showing the user's wireless device 100 at a first location near a first wireless access point 140A and then later at a second location, near a second wireless access point 140B. A LAN interconnects the access points with the Internet, which in turn is connected to several content servers. The user's wireless device 100 can also communicate over longer distances with a mobile network transceiver 136, connected through a mobile network 138 to the Internet.

FIG. 1 shows an exemplary network diagram of the user's short range wireless capable device, such as e.g. Bluetooth device 100 at a first location near an access point 140A at a location named "A Street". The diagram also shows the user's device 100 at a second location near an access point 140B at a location "B Street". The user's Bluetooth device is shown with a browser 102, keypad 104, and an application program 106. There are four access points shown in the figure, access points 140, 140A, 140B, and 140C, all of which are connected to the local area network (LAN) 142 and capable of short range wireless communication (in this embodiment Bluetooth communication). The LAN 142 is, in turn, connected to the Internet 144. Connected to the Internet are also three content servers, a map content server 180, an advertising content server 184, and a street sign content server 186. Connected to the map content server 180 is a map database 182. As the user's Bluetooth device 100 passes within communicating range of the access point 140A, communication between the Bluetooth device 100, access point 140A and the map database 182, accesses the portion 120 of a graphic map from the database 182 and transfers it for display on the browser 102 of the device 100. Later, as the user's Bluetooth device 100 is within communicating range of the second access point 140B, communication between the device 100, access point 140B, and the map database 182, accesses the portion 122 of the map graphic from the database and transfers it for display on the browser 102 of the device 100. The mechanism for accomplishing this access and transfer of respective portions of the map graphic will be discussed below. The invention can be applied to communications between various types of wireless devices to enable rapid communication, such as between two mobile devices, between fixed and mobile devices, between short range devices or between long range devices. The user's wireless device 100 can communicate over longer distances with the mobile network transceiver 136, connected through the mobile network 138 to the Internet 144.

Figure 1A:
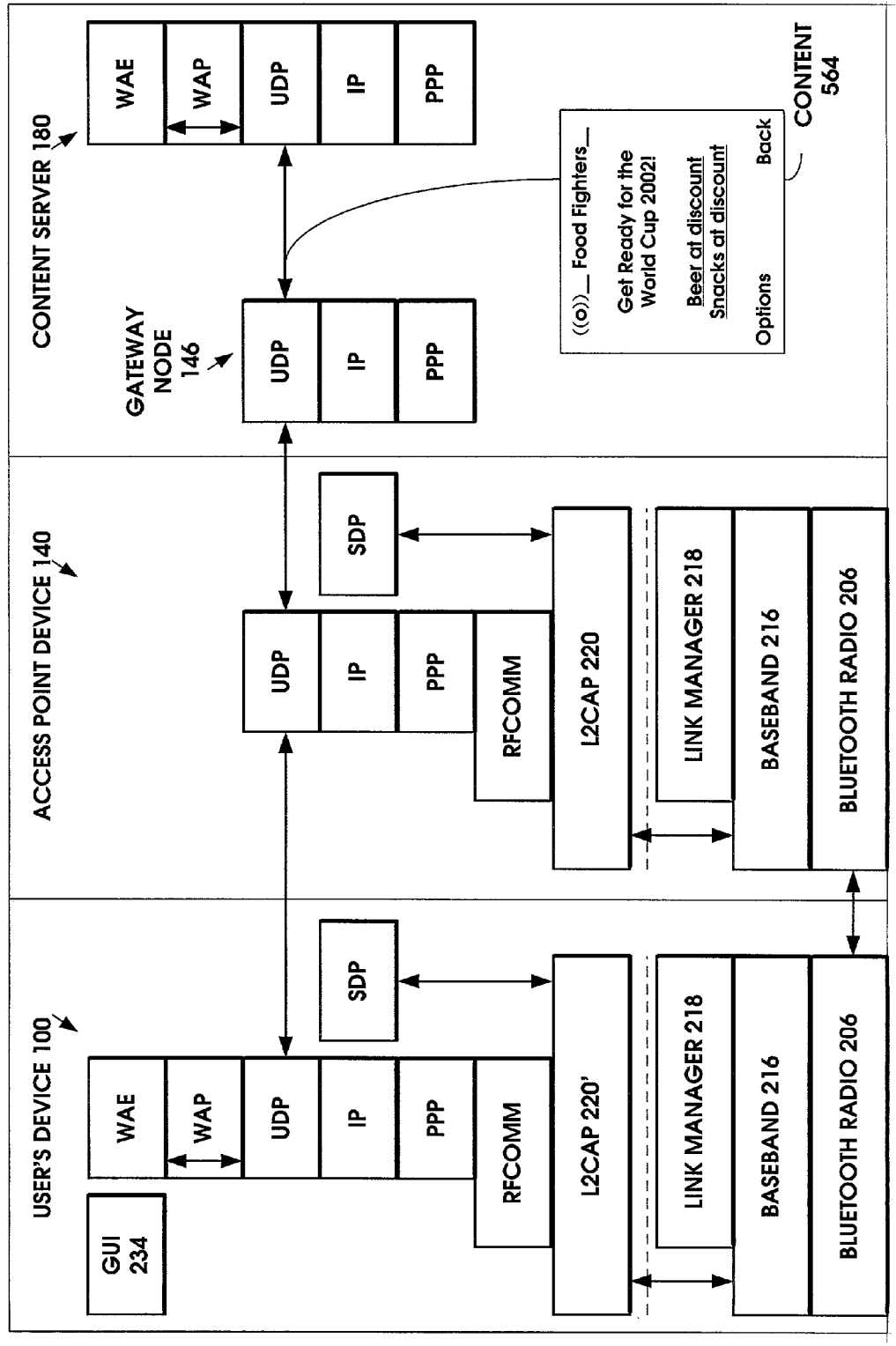
FIG. 1A illustrates the respective prior art protocol stacks for the user's Bluetooth device 100, access point 140, and content server 180.

FIG. 1A illustrates the respective prior art protocol stacks used for the user's Bluetooth device 100, the Bluetooth access point 140, and the content server 180. As is described in detail in the Bluetooth specification, the protocol stack for Bluetooth device is made up of three protocol groups: the transport protocol group, the middleware protocol group and the application group. The transport protocol group includes the link controller and baseband 216, the link manager 218 and the logical link control and adaptation protocol (L2CAP) 220'. The transport protocol group enables Bluetooth devices to locate each other and to create, configure, and manage the physical and logical links that allow higher layer protocols and applications to pass data through these transport protocols. The middleware protocol group includes a serial port emulator protocol called RFCOMM, and the Internet protocols: point-to-point protocol (PPP), Internet protocol (IP), and user datagram protocol (UDP). The application group includes the wireless application protocol (WAP) and the wireless application environment (WAE), as well as graphic user interface (GUI) programs 234 and application programs. Also shown for the user's device 100 is the service discovery protocol (SDP), which enables devices to discover services offered by other Bluetooth devices. This constitutes the protocol stack for the user's prior art device 100. As is shown in FIG. 1A, the access point 140 includes the same transport protocol group and middleware protocol group protocol layers. Also shown in FIG. 1A is a gateway node 146, which includes the UDP, IP, and PPP layers. The content server 180 includes the middleware layers and the WAP and WAE layers of the application group. The purpose of FIG. 1A is to illustrate that the prior art requires the user's device 100 to set up all of the protocol layers in the middleware protocol group and in the application group in order to receive even the most simple content 564 from the content server 180. The time required to set up all of the protocol layers in the user's device 100 in order to establish a connection with the access point device 140 can exceed the short interval during which the user's device 100 is within communication range of the access point 140.

Figure 1B:
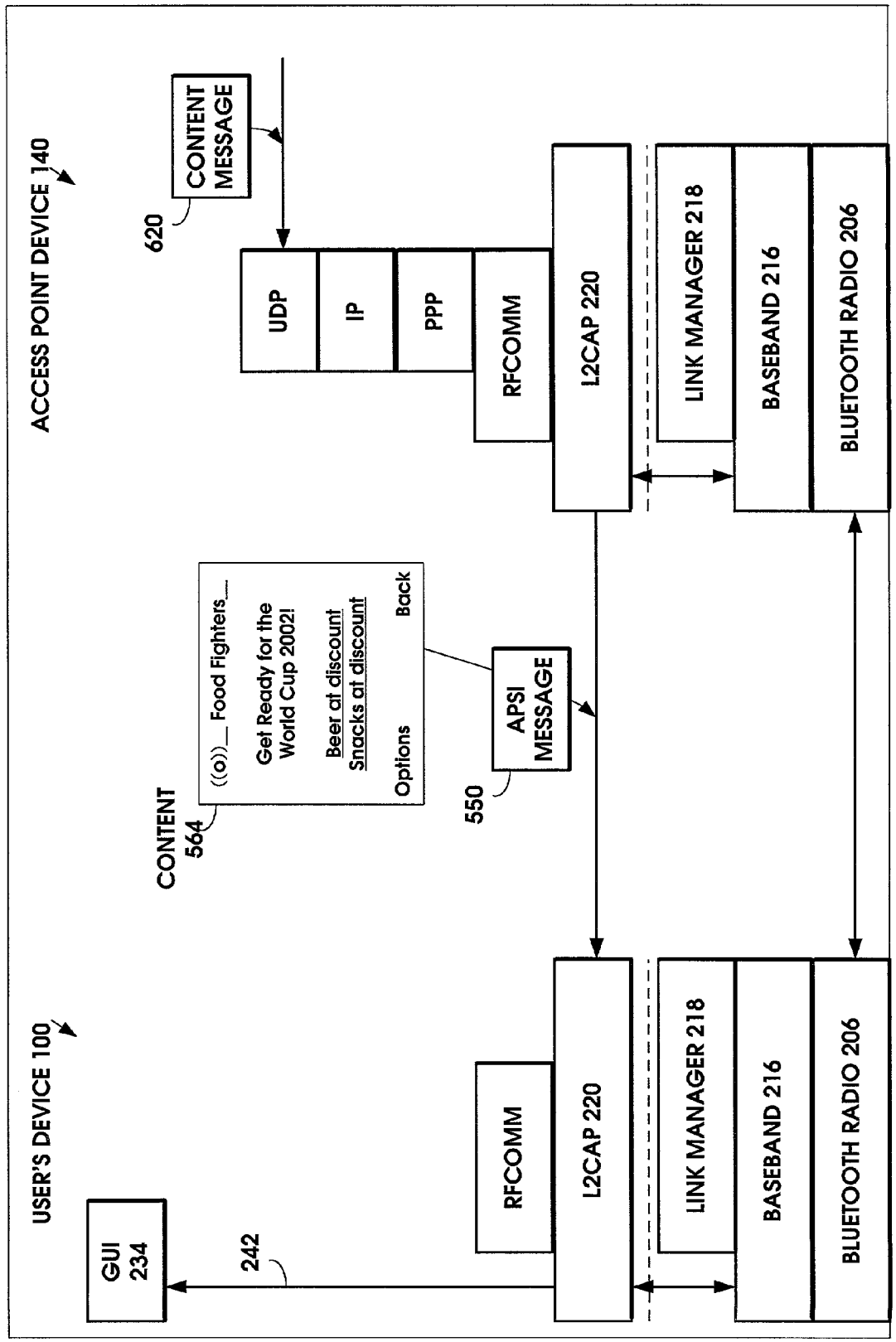
FIG. 1B illustrates the respective protocol stacks for the user's Bluetooth device 100 and access point 140, exchanging content by means of an Access Point Service Indicator (APSI) message 550, in accordance with the invention.

FIG. 1B illustrates the respective protocol stacks for the user's Bluetooth device 100 and the access point 140 exchanging content 564 by means of an Access Point Service Indicator (APSI) message 550, in accordance with the invention. As will be described below, according to one embodiment of the invention the L2CAP layer 220 in the user's device 100 is modified to detect a unique class of device (CoD) value in either a paging packet or an inquiry response packet from the L2CAP layer 220 in the access point 140. When the user's device 100 detects the arrival of a paging packet with the unique CoD value, it indicates that the next packet to be sent by the access point 140 is an access point service indication (APSI) message. Then, when the user's device 100 receives the next packet from the access point, the L2CAP layer 220 in the user's device 100 loads it into an APSI message buffer 236. The L2CAP layer verifies that the packet header for the APSI message 550 has a unique message ID indicating that it is in fact, an APSI message from the access point. Then, the L2CAP layer immediately passes the APSI message directly up to the GUI application layer 234, thereby bypassing the middleware protocol layers as well as the WAP layers in the user's device 100. This significantly reduces the amount of time necessary to set up a connection to enable the user's device 100 to receive and display content 564 contained in the APSI message 550. The principle of the invention also applies where both device 140 and device 100 are mobile wireless devices.

Also shown in FIG. 1B is the receipt by the access point device 140 of a content message 620. As will be described below, if the access point device 140 does not currently have the APSI message 550 stored in its memory, then the access point 140 accesses the content 564 from a content server such as the content server 180 in FIG. 1. The resulting content message 620 contains the content 564 which is assembled by the access point 140 into the APSI message 550 of FIG. 1B.

According to another embodiment of the invention, the user's Bluetooth device 100 does not need to receive any previous indication of the arriving APSI message 550. In this embodiment, immediately after successful paging, the APSI message 550 packet having a unique message ID is received by the user's device 100. The user's Bluetooth device L2CAP layer determines that the message is, in fact, an APSI message 550 from the access point device 140. The user's Bluetooth device L2CAP layer loads the APSI message into an APSI message buffer 236. Then, the L2CAP layer immediately passes the APSI message directly up to the GUI application layer 234, thereby bypassing the middleware protocol layers as well as the WAP layers in the user's device 100. This significantly reduces the amount of time necessary to set up a connection to enable the user's device 100 to receive and display content 564 contained in the APSI message 550.

The invention can be applied to communications between various types of wireless devices to enable rapid communication, such as between two mobile devices, between fixed and mobile devices, between short range devices or between long range devices. Each such device includes the respective protocol stacks shown in FIG. 1B for the user's Bluetooth device 100 and the access point 140, to enable exchanging content 564 by means of an Access Point Service Indicator (APSI) message 550, in accordance with the invention.

Figure 1C:
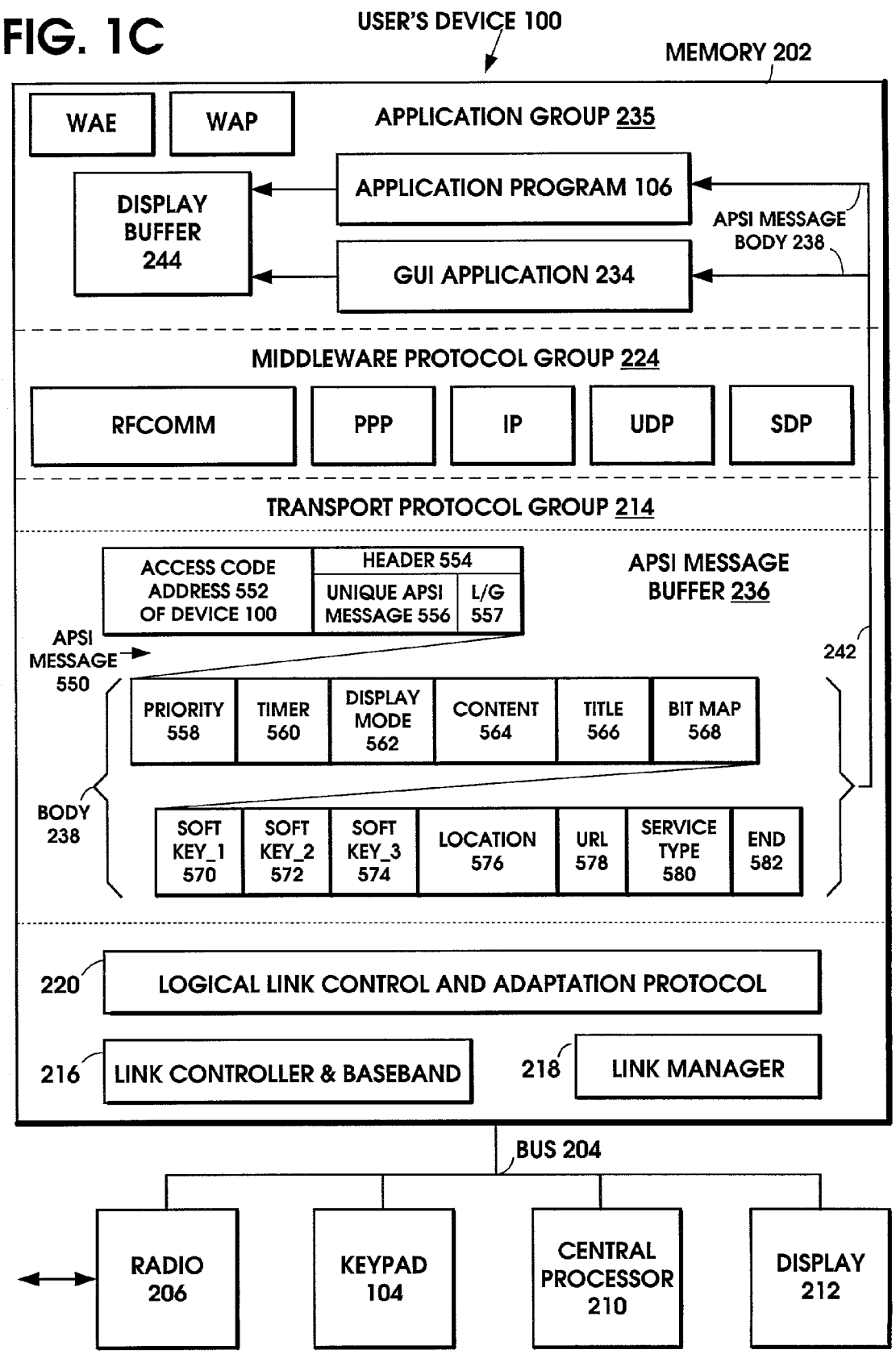
FIG. 1C is a functional block diagram of the user's wireless device 100, showing the APSI message buffer 236, in accordance with one embodiment of the invention.

FIG. 1C is a functional block diagram of the user's Bluetooth device 100, showing the APSI message buffer 236, in accordance with one embodiment of the invention. FIG. 1C shows a memory 202, connected by means of a bus 204 to a Bluetooth radio 206, a keypad 104, a central processor 210, and a display 212. The memory 202 stores program instructions which are sequences of operational steps, which, when executed by the central processor 210, carry out the function of the invention. The memory 202 is shown partitioned into transport protocol group 214, middleware group 224, and application group 235. Within the transport protocol group 214, there is a link controller and baseband 216, a link manager 218, a logical link control and adaptation protocol 220, and an APSI message buffer 236. In the middleware protocol group 224 is the RFCOMM, the PPP, the IP, the UDP and SDP protocol layers. In the application group 235 is a GUI application 234, an application program 106, a display buffer 244, the WAE and the WAP protocol layers. In accordance with the invention, APSI message 550 contained in the APSI message buffer 236 is recognized by the logical link control and adaptation protocol 220, and the body 238 of the APSI message 550 is immediately provided over the path 242 to the GUI application 234 and the application program 106.

FIG. 2A is a functional block diagram of the Bluetooth access point 140, with a receive packet buffer 252, a trigger word table 260, an APSI message cache 285, and an APSI cache hit logic 283 according to one embodiment of the invention. A server notification message table 280 is also shown in FIG. 2A. In accordance with the invention, the access point 140 stores Access Point Service Indicator (APSI) messages in the APSI message cache 285, which characterize service platform offerings.

When the user's device 100 sends either a paging packet or an inquiry response packet, such as inquiry response packet 510, to the access point 140, the access point according to one embodiment of the invention use the information in the received packet as stimuli to be matched with trigger words stored in the trigger word table 260. For example, the address of the device 100 in field 520 can be matched with address values 266 in the trigger word table 260. Also, the class of device of the device 100 in field 522 can be compared with class of device values 268 stored in the trigger word table 260. If there is a match, then the APSI message cache 285 is checked by means of the APSI cache hit logic 283, to determine if a corresponding APSI message is stored in the cache 285. If there is a corresponding APSI message in the cache 285, then the APSI message is immediately sent to the mobile Bluetooth device 100. If there is no corresponding APSI message in the message cache 285, then the APSI cache hit logic 283 signals the server notification message table 280 to send a server notification message 610 to a content server specified in the message. In an alternative embodiment the access point 140 does no checking in the trigger word table 260 and it just immediately after successful paging sends the APSI message 550 stored in the APSI message cache 285 to the Bluetooth mobile device.

FIG. 2B is a dataflow diagram showing an inquiry response packet 510 from the user's device 100 being detected by the access point 140. FIG. 2B shows the access point sending an event message 610 to the content server 180 in response to the access point determining that it does not have a corresponding APSI message in its cache 285. The event message 610 can include specific data values for a server notification message number, trigger word number, the address of the user's Bluetooth device 100, its class of device, other information, the access point address, the destination server path name and the destination server URL. FIG. 2B shows the event message 610 being sent to the map content server 180.

FIG. 2C is a dataflow diagram showing the content server 180 returning a content message 620 to the access point 140, in response to the server 180 having processed the event message 610. FIG. 2C shows that the content message 620 includes content information, which will ultimately be incorporated into the APSI message 550.

FIG. 2D is a dataflow diagram showing the access point 140 sending the APSI message 550 to the user's mobile device 100, which the access point 140 has assembled from the content message 620 received from the server 180.

FIG. 3 is a flow diagram of the operation of the User's Bluetooth device 100 according to one embodiment of the invention when receiving an APSI message 550. The figure shows the following steps 300 to 332.

Step 300: User device 100 receives the paging packet 530 (FIG. 4C) from the access point (AP) device 140.

Step 302: The user device's L2CAP layer 220 determines in decision block 304, if the class of device (CoD) field 542 in the paging packet 530 indicates that the next packet is an Access Point Service Indication (APSI) message 550.

Step 320: If it is, then when the user's device 100 receives the next packet(s) from the AP 140, the L2CAP layer 220 loads it into an APSI message buffer 236.

Step 322: The L2CAP layer 220 verifies that packet header 554 indicates an APSI message 550 from the AP 140.

Step 324: Then, the L2CAP layer 220 passes the APSI message 550 directly to the GUI application layer 234. The APSI message 550 contains fields for content, title, bitmap, soft key selection items, location information, service type information and URL.

Step 326: The GUI layer 234 then loads the content, title, bitmap, soft key selection items, location information, service type information and URL from the APSI message 550 into the display buffer 244.

Step 328: Then, the user selectively enters an input to the GUI 234 to establish a connection with the AP 140 for a session with the service platform server 180.

Step 330: The user device 100 and the AP 140 then open an SDP and/or a non-SDP channel and they begin a session.

Step 332: The AP 140 registers the user's device 100 with the service platform server 180 and requests service for the user's device 100. Then, the user's device 100 and the service platform server 180 conduct a session via the AP 140. The service platform server 180 can then download the maps, advertising and/or other service offerings to the mobile Bluetooth device 100.

Alternately, if Step 302 determines in decision block 304 that the class of device (CoD) field 542 in the paging packet 530 does not indicate that the next packet is an Access Point Service Indication (APSI) message 550, then the process flows through steps 306 to 318.

Step 306: The user's device 100 opens the service discovery protocol (SDP) channel and begins a session with the access point 140.

Step 308: The user's device 100 opens a non-SDP channel with the access point 140.

Step 310: The user's device 100 waits for registration of the user's device and request for service via the access point 140 from the service platform server 180.

Step 312: The user's device 100 conducts a service session via the access point 140 with the service platform server 180.

Step 314: The user's device 100 receives a service message at the L2CAP layer 220 with content, title, bitmap, soft key selection items, location information, service type information and URL.

Step 316: The L2CAP layer 220 passes the service message up through all of the layers RFCOMM, PPP, IP, UDP, WAP, and WAE of the protocol stack in the user's device 100, to the GUI application layer 234.

Step 318: The GUI application layer 234 loads the content, title, bitmap, soft key selection items, and URL, from the service message into the display buffer 244. Optionally, location information and service type information can also be loaded into the display buffer 244.

In FIG. 3A, a flow diagram of an alternate embodiment of the invention shows the operation of the User's Bluetooth device 100 when receiving an APSI message 550 without any previous warnings. The figure shows the steps 400 to 412.

Step 400: User device 100 sends inquiry response packet 510 (FIG. 4B) and receives the paging packet 530 (FIG. 4C) from the access point (AP) device 140.

Step 402: The user device 100 receives the next packet(s) from the AP, and the L2CAP layer 220 determines that packet header 554 indicates an APSI message 550 from the AP 140 and the L2CAP layer 220 loads it into an APSI message buffer 236.

Step 404: Then, the L2CAP layer 220 passes the APSI message 550 directly to the GUI application layer 234. The APSI message 550 contains fields for content, title, bitmap, soft key selection items, location information, service type information and URL.

Step 406: The GUI layer 234 then loads the content, title, bitmap, soft key selection items, location information, service type information and URL from the APSI message 550 into the display buffer 244.

Step 408: Then, the user selectively enters an input to the GUI 234 to establish a connection with the AP 140 for a session with the service platform server 180.

Step 410: The user device 100 and the AP 140 then open an SDP and/or a non-SDP channel and they begin a session.

Step 412: The AP 140 registers the user's device 100 with the service platform server 180 and requests service for the user's device 100. Then, the user's device 100 and the service platform server 180 conduct a session via the AP 140. The service platform server 180 can then download the maps, advertising and/or other service offerings to the mobile Bluetooth device 100.

If in step 402 the L2CAP layer 220 of the user's device determines from the message header 554 that the message is not an APSI message (no unique APSI message ID 556 in the message header 554), then following process steps follow respective steps 306–318 in the flow diagram illustrated in FIG. 3.

The following paragraphs discuss the use of the Bluetooth inquiry, inquiry response, and paging packets by the invention. To recap, the Bluetooth access point device 140 is connected over a landline network 142 and 144 or alternatively over wireless network to the service platform server 180. The service platform server 180 has service offerings that it would like to make available to mobile Bluetooth devices 100 passing within the RF communications range of the Bluetooth access point device 140. In accordance with the invention, the Bluetooth access point device 140 stores an Access Point Service Indicator (APSI) message 550 characterizing the offerings of the service platform server 180.

According to one embodiment of the invention, in order to quickly communicate and display the content of the APSI message 550 on the user's device 100, notification of the impending arrival of the APSI message 550 is made by information inserted by the access point 140 into the inquiry response packets or paging packets sent to the user's device 100. According to another embodiment of the invention the recognition of the message can also be accomplished without any previous notification to the terminal.

The Bluetooth access point device 140 periodically sends out Bluetooth inquiry packets 500 via RF link to any mobile Bluetooth devices 100 within the RF communications range. FIG. 4A shows the Bluetooth packet structure for an inquiry packet 500 sent by a Bluetooth access point device to the user's device 100. The general inquiry access code (GIAC) of the packet 500 is recognized by all Bluetooth devices as an inquiry message. During the inquiry procedure, any other Bluetooth devices that are in the inquiry scan state, such as the user's device 100, are scanning for the receipt of inquiry packets 500. If the user's device 100 in the inquiry scan state receives the inquiry packet 500, it will respond with an inquiry response packet 510 that has sufficient information to enable the Bluetooth access point device to build its inquiry response table of essential information required to make a connection. Any Bluetooth device recognizing inquiry packet 500 can respond. FIG. 4B shows the Bluetooth frequency hop synchronization (FHS) packet structure for an inquiry response packet 510 sent by the user's device 100. The FHS packet structure for an inquiry response packet 510 sent by the user's device 100 includes an access code field 512, a header which includes a slave member number field 514 in which AM_ADDR is not yet assigned and is set to zero, a type field 516 and a parity field 518. Another slave member number field 524 also has AM_ADDR set to zero. Field 522 contains user's class-of-device (CoD) information. The FHS packet structure for an inquiry response packet 510, provides essential information about the user's device 100 that enables the Bluetooth access point device to the make a connection to the user's device: Field 520 contains the user's device BD_ADDR and field 526 contains the user's device current clock value.

The Bluetooth access point device uses the information provided in the inquiry response packet 510 it has received from the user's device to be paged, to prepare and send a paging message to the user's paged device. To establish a connection, the access point paging device must enter the page state. The Bluetooth access point device invokes its link controller to enter the page state, where it will transmit paging messages to the user's paged device using the access code and timing information acquired from the inquiry response packet 510. The user's paged device must be in the page scan state to allow the access point paging device to connect with it. Once in the page scan state, the user's paged device will acknowledge the paging messages and the access point paging device will send a paging packet 530 shown in FIG. 4C, which provides the clock timing and access code of the Bluetooth access point paging device to the user's paged device. The paging packet 530 includes the class of device (CoD) field 542 that is a 24-bit field usually used to specify the class of the paging device, such as "FAX machine".

In accordance with one embodiment of the invention, the class of device (CoD) field 542 of the paging packet 530 sent by the Bluetooth access point paging device includes a unique value indicating that the next packet to be received from the Bluetooth access point paging device is the Access Point Service Indicator (APSI) message.

Since Bluetooth access point device has initiated the page, it will be the master device in the new piconet being formed by the two devices. The user's paged device, which will become the slave to the Bluetooth access point device, must also know the Bluetooth access point device BD_ADDR, since it is the master device's address that is used in the piconet access code for the new piconet being formed by the two devices. FIG. 4C shows the Bluetooth frequency hop synchronization (FHS) packet structure for a paging packet 530 sent by the Bluetooth access point device. The FHS packet structure for the paging packet 530 sent by the Bluetooth access point device includes an access code field 532 which contains the user's paged device's BD_ADDR, a header which includes a slave member number field 534 in which AM_ADDR is now assigned the value of one, a type field 536 and a parity field 538. Another slave member number field 544 also has AM_ADDR set to one. Field 542 contains the Bluetooth access point device class-of-device (CoD) unique value.

According to one embodiment of the invention, the CoD field 542 indicates that the next packet sent to the terminal is an APSI message. If such indication is used, the user's device 100 can be set to a mode where APSI messages are refused and if refusal is preferred, the user's device 100 is automatically set to not reply to paging with APSI indication.

The FHS packet structure for the paging packet 530, provides the essential information about the Bluetooth access point device that enables the user's paged device to the make the connection to the Bluetooth access point device: Field 540 contains the Bluetooth access point device BD_ADDR and field 546 contains the Bluetooth access point device current clock value.

In accordance with the invention, FIG. 4D shows the Bluetooth packet structure for the subsequent APSI message 550 according to one embodiment of the invention. The APSI message includes a header 554 that has the unique message ID 556 that indicates it is an APSI message. In the APSI message header there is also message type information 557. Also included in the APSI message 550 in the body portion 238, is priority information 558, timer information 560, display mode information 562, content 564, title 566, bit map 568, soft key selection_1 information 570, soft key selection_2 information 572, soft key selection_3 information 574, location information 576, service type information 578, URL information 580, and an end marker 582. The priority information 558 is used to prioritize received messages so, that when a higher priority message is received at the user's device 100, it may override a message already at the display buffer 244. This prioritizing is very useful if rapid notification messages are needed to be sent to the vicinity. The timer information 560 may be used to determine the time period of a certain message on the display of the user's device 100. Location information includes coordinates and a location name. These parameters can be applied in the GUI of the user's device in an appropriate manner. Service type information including Local/Global parameters describe whether the service is available locally, i.e., only inside the current Bluetooth coverage area. Global means that the service is available inside the Bluetooth coverage area, but also outside the coverage area. When the service is available also outside the Bluetooth coverage area, the user's device queries whether a default bearer (e.g., WAP over GSM-data) may be activated in order to maintain the connection to the service. The service type information 578 may also include information of the type of the message, such as whether the message is e.g. a warning message, a notification message or an advertising message.

Instead of the access point 140 sending out an inquiry packet 500 and receiving an inquiry response packet 510 from user's device 100 with the user device's address 520 and class of device 522 information, the user's device 100, itself, can initiate the connection. The user's device 100 can send out an inquiry packet 500 shown in FIG. 4A. The access point 140 will respond with an inquiry response packet, modified from that shown for packet 510 in FIG. 4B, by having the sender's address field 520 contain the access point's address and by having the sender's class of device field 522 contain the unique CoD value. According to one embodiment of the invention the unique CoD value identifies that the next packet to be sent by the access point 140 is the APSI message 550. The access point 140 will then have to wait until the user's device 100 responds with a page packet similar to packet 530 of FIG. 4C, since the access point 140 will need the address in the sender's address field 540 of the page packet in order to use it as the destination address 552 in the APSI message 550. The user device's paging packet 530, will contain the user device's address in field 540 and class of device information in field 542, which is the information needed by the access point 140 to select and return an appropriate APSI message 550. The user device's paging packet 530 received by the access point 140, will be buffered in the receive packet buffer 252 of FIG. 2A. There, its sender's address field 540 of FIG. 4C can be matched with address value 266 in the trigger word table 260 of FIG. 2A. For example, the address of the device 100 in field 540 can be matched with address values 266 in the trigger word table 260. Also, the class of device of the device 100 in field 542 can be compared with class of device values 268 stored in the trigger word table 260. If there is a match, then the APSI message cache 285 is checked by means of the APSI cache hit logic 283, to determine if a corresponding APSI message 550 is stored in the cache 285. If there is a corresponding APSI message in the cache 285, then the APSI message 550 is immediately sent to the mobile Bluetooth device 100.

FIG. 5 is a network process diagram showing the interaction between the user's device 100, the access point 140, and the content server 180 according to one embodiment of the invention. The network process diagram is divided into three columns with the user's device 100 on the left column, the access point device 140 in the middle column, and the content server 180 in the right hand column. The network process begins with step 300 in the user's device 100 sending an inquiry response 510 to the access point 140 and receiving a page 530 from the access point. The corresponding step at the access point 140 is step 600 where the access point receives the inquiry response packet 510 (which is shown in FIG. 4B) from the user's device 100. Remaining at the access point device 140 in FIG. 5, step 600 flows to step 602 wherein the access point determines that a trigger word is satisfied in its trigger table 260 by the receipt of information in the inquiry response 510. Then step 602 passes to the decision block 603, which determines whether a corresponding APSI message 550 is currently stored in the local APSI cache 285. If it is, then the decision block 603 passes to step 624 where the access point 140 sends the APSI message 550 shown in FIG. 4D to the user's device 100. Alternately, if the decision block 603 determines that the corresponding APSI message 550 is not stored in the local APSI cache 285, then block 603 flows to step 604. In step 604, the access point 140 forwards its access point address 290 and the user's device ID 284 in an event message 610 of FIG. 2B to the content server 180. Turning now to the content server 180 of FIG. 5, step 614 receives the event message 610 and the content server 180 accesses content in its database 182 in response to the user's device ID 284 and the access point address 290. Step 614 then flows to step 616 in the content server 180, where the content server returns the content information in a content message 620 of FIG. 2C to the access point 140 as specified in the access point address 290 provided in the event message 610. Returning to the access point 140 in FIG. 5, step 622 receives the content message 620 and uses it to assemble the APSI message 550 so as to contain the content 564, title 566, bit map 568, soft key_1 selection information 570, soft key_2 selection information 572, soft key_3 selection information 574, location information 576, URL information 578, service type information 580 contained in the content message 620 of FIG. 2C. Then step 622 flows to step 624, wherein the access point 140 sends the newly assembled APSI message 550 to the user's device 100. Turning now to the user's device 100 of FIG. 5, step 304 is optional and depending on the embodiment of the invention. Step 320 receives the APSI message 550 and stores it in the APSI message buffer 236. Then in step 322, the user's device 100 verifies with the L2CAP layer 220 that the packet header 554 of the received packet indicates that it is in fact an APSI message 550 as shown in FIG. 4D. Then step 322 flows to step 324 where the L2CAP layer 220 immediately passes the APSI message 550 over path 242 to the GUI application layer 234, thereby bypassing the middleware protocol group 224 layers. The content 564, title 566, bit map 568, soft key_1 selection information 570, soft key_2 selection information 572, soft key_3 selection information 574, location information 576, URL information 578, service type information 580 are then processed by the application group 235 programs and the content 564 is displayed to the user in the browser 102.

Note that decision block 603 of FIG. 5 enables the access point to pass directly to step 624 to send the APSI message (s) stored in its memory directly to all mobile devices entering its coverage area, without fetching content for APSI messages from the server.

Alternate embodiments of the invention:

[1] There are four lower protocol layers in the Bluetooth user device 100 protocol stack shown in FIG. 1B, that are able to perform the function of alerting the device 100 that the next packet is an APSI message 550.

The four lower protocol layers are:

[a] The Link Controller and Baseband layer 216, which actually does the paging;

[b] The Link Manager and Link Manager Protocol layer 218 (the LMP_PDUs);

[c] The L2CAP layer 220, and

[d] The RFCOMM layer.

[2] The L2CAP layer (or an alternate lower layer in the protocol stack) is reprogrammed in accordance with the invention as described above, to recognize a unique class of device (CoD) value for the purpose of alerting the mobile device 100 that the next packet is an APSI message 550. Alternately, the L2CAP layer 220 can be reprogrammed to recognize the unique message ID 556 in the APSI message header 554, itself, thereby eliminate the alerting step with the paging packet 530.

[3] The invention can also be applied to other short range wireless protocols such as the IEEE 802.11 MAC and the HiperLAN/2 MAC. Both of these protocols have many layers between the MAC layer and the GUI, and they benefit from bypassing these layers in the user's mobile device for quick processing of messages from an access point. Both of these protocols have beacon frames that are used in the same way that is done for the Bluetooth page packet 530, as described above, to recognize a unique value (e.g., the unique CoD value) for the purpose of alerting the mobile device 100 that the next packet is an APSI message 550. Both of these protocols are fully capable of then sending an APSI message 550 to the user device for quick processing, as described above.

The resulting invention solves the problem of minimizing the protocol stacks needed for a short range wireless access point to rapidly communicate a message to a short range mobile wireless device and display it to the user. The invention enables enable rapid communication between various types of wireless communication devices, including paired mobile devices, paired fixed and mobile devices, short range devices, and long range devices.

Although a specific embodiment of the invention has been disclosed, it will be understood by those having skill in the art that changes can be made to that specific embodiment without departing from the spirit and the scope of the invention.

What is claimed is:

1. A method in a wireless access point for reducing the protocol stacks needed to rapidly communicate a message to a wireless mobile device and display it to the user, comprising:

storing in a wireless access point device an Access Point Service Indicator (APSI) message describing offerings of a service platform coupled to the access point device, the APSI message having a unique message ID in its header;

sending from the wireless access point a first occurring packet containing information to alert a wireless mobile device that a following packet contains the APSI message and is qualified to bypass intervening protocol layers beneath an application layer in the wireless mobile device;

sending the APSI message from the access point to the mobile device; and alerting a transport protocol layer in the mobile device to pass said APSI message directly to the application layer in the mobile device, without needing to construct or pass through intervening layers, by means of the unique message ID in the header of the APSI message.

2. The method in the wireless access point of claim 1, wherein said APSI message contains fields for content, title, bitmap, soft key selection items, location information, service type information and URL.

3. A method in a wireless access point for reducing the protocol stacks needed to rapidly communicate a message to a wireless mobile device and display it to the user, comprising:

storing in a wireless access point device an Access Point Service Indicator (APSI) message describing offerings of a service platform coupled to the access point device, the APSI message having a unique message ID in its header;

sending a paging packet from the access point device to a wireless mobile device, the paging packet including a class of device (CoD) field having a unique CoD value indicating that a next packet to be sent by the access point device is an APSI message;

sending the APSI message from the access point to the mobile device; and alerting a transport protocol layer in the mobile device to pass said APSI message directly to the application layer in the mobile device, without needing to construct or pass through intervening layers, by means of the unique message ID in the header of the APSI message.

4. The method in the wireless access point of claim 1, wherein the wireless communication is Bluetooth communication.

5. The method in the wireless access point of claim 2, wherein said GUI layer in the mobile device loads the content, title, bitmap, soft key selection items, location information, service type information and URL from the APSI message into a display buffer at the mobile device.

6. A method in a wireless access point for reducing the protocol stacks needed to rapidly communicate a message to a wireless mobile device and display it to the user, comprising:

storing in a wireless access point device an Access Point Service Indicator (APSI) message describing offerings of a service platform coupled to the access point device, the APSI message having a unique message ID in its header;

sending the APSI message from the access point to the mobile device; and alerting a transport protocol layer in the mobile device to pass said APSI message directly to the application layer in the mobile device, without needing to construct or pass through intervening layers, by means of the unique message ID in the header of the APSI message;

wherein said APSI message contains fields for content, title, bitmap, soft key selection items, location information, service type information and URL;

wherein said GUI layer in the mobile device loads the content, title, bitmap, soft key selection items, location information, service type information and URL from the APSI message into a display buffer at the mobile device;

receiving a user input from the mobile device to establish a connection with the mobile device for a session with the service platform, in response to a display of the content to the user;

opening a channel with the mobile device;

sending a request to the service platform for registration of the mobile device to the service platform; and conducting a session between the mobile device and the service platform.

7. A method in a wireless mobile device for reducing the protocol stacks needed to rapidly communicate a message received from a wireless access point device and display it to the user, comprising:

receiving from a wireless access point a first occurring packet containing information to alert a wireless mobile device that a following packet contains an Access Point Service Indicator (APSI) message and is qualified to bypass intervening protocol layers beneath an application layer in the wireless mobile device;

receiving the APSI message from the access point, said APSI message describing offerings of a service platform coupled to the access point device, the APSI message having a unique message ID in its header; and using a transport protocol layer in the mobile device to pass said APSI message directly to a GUI application layer in the mobile device, without needing to construct or pass through intervening layers.

8. A method in a wireless mobile device for reducing the protocol stacks needed to rapidly communicate a message received from a wireless access point device and display it to the user, comprising:

receiving a paging packet from an access point device, the paging packet including a class of device (CoD) field having a unique CoD value indicating that a next packet to be sent by the access point device is an Access Point Service Indicator (APSI) message;

receiving an Access Point Service Indicator (APSI) message from the access point, said APSI message describing offerings of a service platform coupled to the access point device, the APSI message having a unique message ID in its header; and using a transport protocol layer in the mobile device to pass said APSI message directly to a GUI application layer in the mobile device, without needing to construct or pass through intervening layers.

9. The method in the wireless mobile device of claim 7, wherein the wireless communication is Bluetooth communication.

10. The method in a wireless mobile device of claim 7, wherein said APSI message contains fields for content, title, bitmap, soft key selection items, location information, service type information, and URL.

11. The method in a wireless mobile device of claim 10, wherein said GUI layer loads the content, title, bitmap, soft key selection items, location information, service type information, and URL from the APSI message into a display buffer.

12. A method in a wireless mobile device for reducing the protocol stacks needed to rapidly communicate a message received from a wireless access point device and display it to the user, comprising:

receiving an Access Point Service Indicator (APSI) message from an access point, said APSI message describing offerings of a service platform coupled to the access point device, the APSI message having a unique message ID in its header;

using a transport protocol layer in the mobile device to pass said APSI message directly to a GUI application layer in the mobile device, without needing to construct or pass through intervening layers;

wherein said APSI message contains fields for content, title, bitmap, soft key selection items, location information, service type information, and URL;

wherein said GUI layer loads the content, title, bitmap, soft key selection items, location information, service type information, and URL from the APSI message into a display buffer;

receiving a user input to the GUI layer to establish a connection with the access point for a session with the service platform, in response to a display of the content to the user;

opening a channel with the access point;

obtaining registration of the mobile device to the service platform via the access point; and beginning a session between the mobile device and the service platform via the access point.

13. The method in the wireless mobile device of claim 7, further comprising:

exchanging RF messages with a network transceiver coupled to the service platform.

14. A method to enable a wireless access point to rapidly communicate a message to a wireless mobile device and display it to the user, comprising:

receiving in a wireless access point, a wireless packet from a mobile wireless device;

determining whether a corresponding Access Point Service Indicator (APSI) message is stored in the access point describing offerings of a service platform coupled to the access point device the APSI message having a unique message ID in its header;

immediately sending the APSI message to the mobile device, if the message is found in the access point;

alerting a transport protocol layer in the mobile device to pass said APSI message directly to the application layer in the mobile device, without needing to construct or pass through intervening layers, by means of the unique message ID in the header of the APSI message;

alternately determining there is no corresponding APSI message stored in the access point and in response, sending a server notification message to a server to access content information;

receiving the content information from the server for a new APSI message; and sending the new APSI message to the mobile wireless device.

15. The method of claim 14, which further comprises:

said server notification message including the mobile device's address and class of device, plus optional ambient information such as the time of day, local weather, or geographic coordinates.

16. The method of claim 14, which further comprises:

said server using information in the server notification message for an appropriate query to access the content information.

17. The method of claim 14, which further comprises:

said content information including content, title, bitmap, soft key selection items, location information, service type information, and URL.

18. A wireless access point to enable reducing the protocol stacks needed in a wireless mobile device so as to rapidly communicate a message to the mobile device and display it to the user, comprising:

a cache in a wireless access point device for storing an Access Point Service Indicator (APSI) message describing offerings of a service platform coupled to the access point device, the APSI message having a unique message ID in its header; and a transmitter in the access point for sending the APSI message from the access point to a wireless mobile device;

said transmitter sending a first occurring packet containing information to alert the wireless mobile device that a following packet contains the APSI message and is qualified to bypass intervening protocol layers beneath an application layer in the wireless mobile device;

said APSI message alerting a transport protocol layer in the mobile device to pass said APSI message directly to an application layer in the mobile device, without needing to construct or pass through intervening layers.

19. The wireless access point of claim 18, wherein said APSI message contains fields for content, title, bitmap, soft key selection items, location information, service type information, and URL.

20. A wireless access point to enable reducing the protocol stacks needed in a wireless mobile device so as to rapidly communicate a message to the mobile device and display it to the user, comprising:

a cache in a wireless access point device for storing an Access Point Service Indicator (APSI) message describing offerings of a service platform coupled to the access point device, the APSI message having a unique message ID in its header; and a transmitter in the access point for sending the APSI message from the access point to a wireless mobile device;

said APSI message alerting a transport protocol layer in the mobile device to pass said APSI message directly to an application layer in the mobile device, without needing to construct or pass through intervening layers;

said transmitter sending a paging packet from the access point device to the wireless mobile device, the paging packet including a class of device (CoD) field having a unique CoD value indicating that a next packet to be sent by the access point device is the APSI message;

said paging packet alerting the mobile device that the next packet to be received from the access point will be the APSI message, by means of the unique CoD value in the paging packet.

21. The wireless access point of claim 18, wherein the wireless communication is Bluetooth communication.

22. A wireless mobile device for reducing the protocol stacks needed to rapidly communicate a message received from a wireless access point device and display it to the user, comprising:

a message buffer in a wireless mobile device for receiving an Access Point Service Indicator (APSI) message from a wireless access point, said APSI message describing offerings of a service platform coupled to the access point device, the APSI message having a unique message ID in its header;

said message buffer receiving from the wireless access point a first occurring packet containing information to alert the wireless mobile device that a following packet contains an APSI message and is qualified to bypass intervening protocol layers beneath an application layer in the wireless mobile device; and a transport protocol layer in the wireless mobile device to pass said APSI message directly to an upper application layer in the mobile device, without needing to construct or pass through intervening layers.

23. A wireless mobile device for reducing the protocol stacks needed to rapidly communicate a message received from a wireless access point device and display it to the user, comprising:

a message buffer in a wireless mobile device for receiving an Access Point Service Indicator (APSI) message from a wireless access point, said APSI message describing offerings of a service platform coupled to the access point device, the APSI message having a unique message ID in its header;

a transport protocol layer in the wireless mobile device to pass said APSI message directly to an upper application layer in the mobile device, without needing to construct or pass through intervening layers; and a packet buffer in the wireless mobile device for receiving a paging packet from the wireless access point device, the paging packet including a field having a unique value indicating that a next packet to be sent by the access point device will be the Access Point Service Indicator (APSI) message.

24. The wireless mobile device of claim 22, wherein said APSI message contains fields for content, title, bitmap, soft key selection items, location information, service type information, and URL.

25. The wireless mobile device of claim 22, wherein the wireless communication is Bluetooth communication.

26. The wireless mobile device of claim 22, further comprising:

means for exchanging RF messages with a network transceiver coupled to the service platform.

27. A computer program product to enable a wireless mobile device to reduce the protocol stacks needed to rapidly communicate a message received from a wireless access point device and display it to the user, comprising:

a computer readable medium;

program code in said computer readable medium for receiving from a wireless access point a first occurring packet containing information to alert a wireless mobile device that a following packet contains an Access Point Service Indicator (APSI) message and is qualified to bypass intervening protocol layers beneath an application layer in the wireless mobile device;

program code in said computer readable medium for receiving the APSI message from the wireless access point, said APSI message describing offerings of a service platform coupled to the access point device, the APSI message having a unique message ID in its header; and program code in said computer readable medium for using a transport protocol layer in the mobile device to pass said APSI message directly to a GUI application layer in the mobile device, without needing to construct or pass through intervening layers.

28. A computer program product to enable a wireless mobile device to reduce the protocol stacks needed to rapidly communicate a message received from a wireless access point device and display it to the user, comprising:

a computer readable medium;

program code in said computer readable medium for receiving an Access Point Service Indicator (APSI) message from a wireless access point, said APSI message describing offerings of a service platform coupled to the access point device, the APSI message having a unique message ID in its header;

program code in said computer readable medium for using a transport protocol layer in the mobile device to pass said APSI message directly to a GUI application layer in the mobile device, without needing to construct or pass through intervening layers; and program code in said computer readable medium for receiving a paging packet from the wireless access point device, the paging packet including a class of device (CoD) field having a unique CoD value indicating that a next packet to be sent by the access point device will be the Access Point Service Indicator (APSI) message.

29. The computer program product of claim 27, wherein said APSI message contains fields for content, title, bitmap, soft key selection items, location information, service type information, and URL.

30. The computer program product of claim 27, wherein the wireless communication is Bluetooth communication.

31. The computer program product of claim 27, further comprising:

program code in said computer readable medium for exchanging RF messages with a network transceiver coupled to the platform.

32. A computer program product to enable a wireless mobile device to reduce the protocol stacks needed to rapidly communicate a message received from a wireless access point device and display it to the user, comprising:

a computer readable medium;

program code in said computer readable medium for receiving from a wireless access point a first occurring packet containing information to alert a wireless mobile device that a following packet contains an Access Point Service Indicator (APSI) message and is qualified to bypass intervening protocol layers beneath an application layer in the wireless mobile device;

program code in said computer readable medium representing the APSI message containing fields for content, title, bitmap, soft key selection items, location information, service type information, and URL describing service offerings, the APSI message having a unique message ID in its header; and program code in said computer readable medium for using a transport protocol layer in the mobile device to pass said APSI message directly to an application layer in the mobile device, without needing to construct or pass through intervening layers.

33. The computer program product of claim 32, wherein the wireless communication is Bluetooth communication.

34. A method in a RF communication network for reducing the protocol stacks needed to rapidly communicate a message between at least two RF capable nodes, comprising:

storing in at least one of the nodes a message having a unique ID in its header;

sending from the at least one of the nodes a first occurring message containing information to alert at least one other node that a following message having the unique ID is qualified to bypass intervening protocol layers beneath an application layer in the at least one other node;

sending said message having the unique ID to the at least one other node; and alerting a transport protocol layer in the receiving node to pass said message having the unique ID directly to an application group layer without needing to construct or pass through intervening layers, by means of the unique message ID in the header of said sent message.

35. The method in the RF communication of claim 34, wherein said message contains fields for content, title, bitmap, soft key selection items, location information, service type information and URL.

36. A method in a RF communication network for reducing the protocol stacks needed to rapidly communicate a message between at least two RF capable nodes, comprising:

storing in at least one of the nodes a message having a unique ID in its header;

sending a paging packet from the sending node to the receiving node, the paging packet including a class of device (CoD) field having a unique CoD value indicating that a next packet to be sent by the sending node is a message having a unique ID;

sending said message having the unique ID to at least one other node; and alerting a transport protocol layer in the receiving node to pass said message having the unique ID directly to an application group layer without needing to construct or pass through intervening layers, by means of the unique message ID in the header of said sent message.

37. The method in the RF communication of claim 34, wherein the RF communication is Bluetooth communication.

38. The method in the RF communication of claim 34, which further comprises:

exchanging RF messages with a network transceiver coupled to a network.

39. The method in the RF communication of claim 34, wherein a GUI layer in the receiving node loads the content, title, bitmap, soft key selection items, location information, service type information and URL from the message into a display buffer at the receiving node.

40. A computer program product for enabling reducing the protocol stacks needed to rapidly communicate between at least two RF capable nodes, comprising:

a computer readable medium;

program code in said computer readable medium for forming a header including a unique message ID for alerting a transport protocol layer of the receiver node to pass the message directly to an application group layer without needing to construct or pass through intervening layers;

program code in said computer readable medium for forming a body including at least one part of the group consisting of content, title, bitmap, soft key selection items, location information, service type information and URL; and program code in said computer readable medium for transmitting said unique message after transmission of a first occurring message containing information to alert a receiver that a following message having the unique ID is qualified to bypass intervening protocol layers beneath an application layer in the receiver.

41. A communications device in an RF communication network for reducing the protocol stacks needed to rapidly communicate a message between at least two RF capable nodes, comprising:

a memory in the communications device for storing a message having a unique ID in its header; and a transmitter in the communications device coupled to the memory for sending a first occurring message containing information to alert at least one other node that a following message having the unique ID is qualified to bypass intervening protocol layers beneath an application layer in the at least one other node;

said transmitter sending said message having the unique ID to the at least one other node to alert a transport protocol layer in the receiving node to pass said message having the unique ID directly to an application group layer without needing to construct or pass through intervening layers, by means of the unique message ID in the header.

42. A communications device in an RF communication network for reducing the protocol stacks needed to rapidly communicate a message between at least two RF capable nodes, comprising:

a receiver in the communications device for receiving a first occurring message containing information that a following message that will have a unique ID is qualified to bypass intervening protocol layers beneath an application layer in the communications device;

a memory in the communications device coupled to the receiver for storing the message having the unique ID in its header; and a processor in the communications device coupled to the memory for alerting a transport protocol layer in the communications device to pass said message having the unique ID directly to an application group layer without needing to construct or pass through intervening layers, by means of the unique message ID in the header.

43. A computer program product for a communications device in an RF communication network for reducing the protocol stacks needed to rapidly communicate a message between at least two RF capable nodes, comprising:

a computer readable medium;

program code in said computer readable medium for storing a message having a unique ID in its header;

program code in said computer readable medium for sending a first occurring message containing information to alert at least one other node that a following message having the unique ID is qualified to bypass intervening protocol layers beneath an application layer in the at least one other node; and program code in said computer readable medium for sending said message having the unique ID to the at least one other node to alert a transport protocol layer in the receiving node to pass said message having the unique ID directly to an application group layer without needing to construct or pass through intervening layers, by means of the unique message ID in the header.

44. A computer program product for a communications device in an RF communication network for reducing the protocol stacks needed to rapidly communicate a message between at least two RF capable nodes, comprising:

a computer readable medium;

program code in said computer readable medium for receiving a first occurring message containing information that a following message that will have a unique ID is qualified to bypass intervening protocol layers beneath an application layer in the communications device;

program code in said computer readable medium for receiving the message having the unique ID in its header; and program code in said computer readable medium for alerting a transport protocol layer in the communications device to pass said message having the unique ID directly to an application group layer without needing to construct or pass through intervening layers, by means of the unique message ID in the header.

* * * * *